United States Patent
Li et al.

(10) Patent No.: US 12,416,509 B2
(45) Date of Patent: Sep. 16, 2025

(54) MAP CONSTRUCTION METHOD FOR AUTONOMOUS DRIVING AND RELATED APPARATUS

(71) Applicant: Shenzhen Yinwang Intelligent Technologies Co., Ltd., Shenzhen (CN)

(72) Inventors: Minzhen Li, Shanghai (CN); Cheng Chen, Shenzhen (CN); Ling Cheng, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 308 days.

(21) Appl. No.: 17/896,947

(22) Filed: Aug. 26, 2022

(65) Prior Publication Data

US 2022/0412770 A1    Dec. 29, 2022

Related U.S. Application Data

(63) Continuation of application No. PCT/CN2021/077648, filed on Feb. 24, 2021.

(30) Foreign Application Priority Data

Feb. 29, 2020   (CN) .......................... 202010132737.4

(51) Int. Cl.
*G01C 21/00* (2006.01)
*B60W 60/00* (2020.01)

(52) U.S. Cl.
CPC ....... *G01C 21/3815* (2020.08); *B60W 60/001* (2020.02); *B60W 2552/05* (2020.02);
(Continued)

(58) Field of Classification Search
CPC ............... G01C 21/38; G01C 21/3804; G01C 21/3815; G01C 21/3819; G01C 21/3822;
(Continued)

(56) References Cited

U.S. PATENT DOCUMENTS

| | | | |
|---|---|---|---|
| 2015/0316386 A1 | 11/2015 | Delp | |
| 2016/0098496 A1* | 4/2016 | Joshi | ........................ E01C 1/02 703/1 |

(Continued)

FOREIGN PATENT DOCUMENTS

| | | |
|---|---|---|
| CN | 105783936 A | 7/2016 |
| CN | 106441319 A | 2/2017 |

(Continued)

OTHER PUBLICATIONS

Yang et al., Generating lane-based intersection maps from crowdsourcing big trace data, 2018, Transportation Research Part C (Year: 2018).*

(Continued)

*Primary Examiner* — Russell Frejd
*Assistant Examiner* — Sara J Lewandroski
(74) *Attorney, Agent, or Firm* — Leydig, Voit & Mayer, Ltd.

(57) ABSTRACT

A map construction method and a related apparatus are provided. The method includes: obtaining, based on manual driving track data and/or an obstacle grid map, road information, intersection information, and lane information of a region through which a vehicle has traveled; obtaining road traffic direction information based on the manual driving track data and the road information, and obtaining lane traffic direction information based on the lane information and the road traffic direction information; obtaining intersection entry and exit point information based on the intersection information and the lane traffic direction information; and performing, based on the intersection entry and exit point information, an operation of generating a virtual topology center line to obtain an autonomous driving map of the region through which the vehicle has traveled, where the (Continued)

virtual topology center line is a traveling boundary line of the vehicle in an intersection region.

20 Claims, 20 Drawing Sheets

(52) U.S. Cl.
CPC .................. *B60W 2552/10* (2020.02); *B60W 2554/4044* (2020.02); *B60W 2556/40* (2020.02)

(58) Field of Classification Search
CPC ............ G01C 21/3833; G01C 21/3837; G01C 21/3841; G01C 21/3844; B60W 60/001; B60W 2556/40; B60W 2556/45; B60W 2556/50; B60W 2556/55; B60W 2554/4044; B60W 2552/05; B60W 2552/10
See application file for complete search history.

(56) References Cited

U.S. PATENT DOCUMENTS

| | | | |
|---|---|---|---|
| 2016/0102986 A1* | 4/2016 | Ma | G01C 21/3841 |
| | | | 702/5 |
| 2016/0334221 A1 | 11/2016 | Davidson | |
| 2016/0358349 A1 | 12/2016 | Dorum | |
| 2017/0192436 A1* | 7/2017 | Min | G05D 1/028 |
| 2018/0148052 A1 | 5/2018 | Suto et al. | |
| 2020/0064846 A1 | 2/2020 | Chen et al. | |
| 2020/0132476 A1* | 4/2020 | Roeth | G01C 21/3819 |
| 2020/0149896 A1* | 5/2020 | Bush | G05D 1/0274 |
| 2020/0256698 A1* | 8/2020 | Shi | G01C 21/3867 |

FOREIGN PATENT DOCUMENTS

| | | | | |
|---|---|---|---|---|
| CN | 106842272 A | | 6/2017 | |
| CN | 108036794 A | | 5/2018 | |
| CN | 108053679 A | | 5/2018 | |
| CN | 108362294 A | | 8/2018 | |
| CN | 108645420 A | | 10/2018 | |
| CN | 108959321 A | | 12/2018 | |
| CN | 109084782 A | | 12/2018 | |
| CN | 109470254 A | | 3/2019 | |
| CN | 109752009 A | | 5/2019 | |
| CN | 109931927 A | | 6/2019 | |
| CN | 110220521 A | | 9/2019 | |
| CN | 110634291 A | * | 12/2019 | ............ G01C 21/20 |
| CN | 110706307 A | | 1/2020 | |
| JP | 2017015846 A | | 1/2017 | |
| JP | 2017215653 A | | 12/2017 | |
| JP | 2019132701 A | | 8/2019 | |
| WO | 2019203084 A1 | | 10/2019 | |

OTHER PUBLICATIONS

Blöchliger et al., "Topomap: Topological Mapping and Navigation Based on Visual SLAM Maps," 2018 IEEE International Conference on Robotics and Automation (ICRA), Brisbane, Australia, pp. 3818-3825, Institute of Electrical and Electronics Engineers, New York, New York (May 21-25, 2018).

Ma Xiaolong et al., "Three-dimensional Road Intersection Automatic Inspection and Robotization Modeling Based on Open Scene Graph," Acta Geodaetica et Cartographica Sinica, vol. 43, No. 10, pp. 1083-1091 (Oct. 2014). With an English abstract.

* cited by examiner

MAP CONSTRUCTION METHOD FOR AUTONOMOUS DRIVING AND RELATED APPARATUS

CROSS-REFERENCE TO RELATED APPLICATIONS

This application is a continuation of International Patent Application No. PCT/CN2021/077648, filed on Feb. 24, 2021, which claims priority to Chinese Patent Application No. 202010132737.4, filed on Feb. 29, 2020. The disclosures of the aforementioned applications are hereby incorporated by reference in their entireties.

TECHNICAL FIELD

This application relates to the field of map construction technologies, and in particular, to a map construction method for autonomous driving and related apparatus.

BACKGROUND

Currently, a process of constructing an obstacle grid map is: obtaining a motion posture of a vehicle and image around the vehicle, and extracting landmark information from the image; generating a landmark map and a vehicle driving track based on the motion posture of the vehicle and the landmark information according to a simultaneous localization and mapping (SLAM) algorithm; and detecting a drivable region, and constructing the obstacle grid map based on the vehicle driving track and the detected drivable region. However, the constructed obstacle grid map has low accuracy, cannot meet an automated valet parking scenario in which there is a complex rule and an extreme perception condition, and cannot provide guidance information that meets a driving rule for the vehicle.

Usually, a process of constructing an indoor map of a building is: obtaining a movement track of a moving object; and constructing the indoor map of the building by recording and correcting the movement track of the moving object. However, the constructed indoor map of the building that is represented by a grid map generated by using the conventional technology has low accuracy, cannot provide a road boundary, a lane boundary, road traffic direction information, and lane traffic direction information, cannot provide guidance information that meets a driving rule for a vehicle, and cannot meet an automated valet parking scenario.

An existing process of constructing a topology map is: obtaining a vehicle driving track; extracting key points of the vehicle driving track; and constructing the topology map based on all the extracted key points. However, because the vehicle driving track is random, the topology map cannot meet a plurality of scenarios. In addition, the constructed topology map has low accuracy, and cannot provide a road boundary, a lane boundary, road traffic direction information, and lane traffic direction information.

To resolve a problem that a constructed map cannot meet an automated valet parking scenario in which there is a complex rule and an extreme perception condition, and cannot provide a road boundary, a lane boundary, road traffic direction information, and lane traffic direction information, embodiments of this application provide an autonomous driving map construction method and a related apparatus.

SUMMARY

Embodiments of this application provide an autonomous driving map construction method and a related apparatus, to improve accuracy of a constructed autonomous driving map, so that an autonomous vehicle can better perform autonomous driving by using the autonomous driving map.

According to a first aspect, an embodiment of this application provides an autonomous driving map construction method, including:

obtaining, based on manual driving track data and/or an obstacle grid map, road information, intersection information, and lane information of a region through which a vehicle has traveled; obtaining road traffic direction information based on the manual driving track data and the road information, and obtaining lane traffic direction information based on the lane information and the road traffic direction information; obtaining intersection entry and exit point information based on the intersection information and the lane traffic direction information; and performing, based on the intersection entry and exit point information, an operation of generating a virtual topology center line to obtain an autonomous driving map of the region through which the vehicle has traveled, where the virtual topology center line is a traveling boundary line of the vehicle in an intersection region.

It can be learned that compared with a manner in which a constructed map cannot meet an automated valet parking scenario in which there is a complex rule and an extreme perception condition, and cannot provide a road boundary, a lane boundary, road traffic direction information, and lane traffic direction information, in this embodiment of this application, the road information, the intersection information, and the lane information of the region through which the vehicle has traveled are first obtained, then the road traffic direction information and the lane traffic direction information are separately obtained, next the intersection entry and exit point information is obtained, and finally the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining, based on manual driving track data and/or an obstacle grid map, road information, intersection information, and lane information of a region through which a vehicle has traveled includes:

obtaining, based on the manual driving track data and/or the obstacle grid map, a road boundary of the region through which the vehicle has traveled;

obtaining, based on the road boundary, a road center line of the region through which the vehicle has traveled;

obtaining, based on the road boundary and the road center line, an intersection region of the region through which the vehicle has traveled;

obtaining, based on the road boundary, the road center line, and the intersection region, a lane boundary of the region through which the vehicle has traveled; and obtaining, based on the lane boundary, a lane center line of the region through which the vehicle has traveled.

It can be learned that, in this example, the road boundary, the road center line, the intersection region, the lane boundary, and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining, based on the manual driving track data and/or the obstacle grid map, a road boundary of the region through which the vehicle has traveled includes:
- obtaining a plurality of track point buffer regions based on the manual driving track data and/or the obstacle grid map;
- performing a fusion operation on the plurality of track point buffer regions to obtain a road buffer region; and
- determining a boundary of the road buffer region as the road boundary of the region through which the vehicle has traveled.

It can be learned that, in this example, the plurality of track point buffer regions are obtained, the plurality of track point buffer regions are fused to obtain the road buffer region, and the boundary of the road buffer region is determined as the road boundary of the region through which the vehicle has traveled. The road center line, the intersection region, the lane boundary, and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining, based on the road boundary, a road center line of the region through which the vehicle has traveled includes:
- performing an equi-spaced point forming operation on the road boundary to obtain a road boundary obtained after the equi-spaced point forming;
- obtaining a first Thiessen polygon side set based on the road boundary obtained after the equi-spaced point forming;
- performing, on the first Thiessen polygon side set, an operation of deleting a Thiessen polygon side outside the road boundary obtained after the equi-spaced point forming, to obtain a second Thiessen polygon side set;
- obtaining a buffer region of the road boundary based on the road boundary and a pre-stored first width;
- obtaining a third Thiessen polygon side set based on a Thiessen polygon side that is in the second Thiessen polygon side set and that does not intersect the buffer region of the road boundary;
- performing a dangling line deletion operation on the third Thiessen polygon side set to obtain a fourth Thiessen polygon side set; and
- performing a connecting operation on the fourth Thiessen polygon side set, to obtain the road center line of the region through which the vehicle has traveled.

It can be learned that, in this example, the first Thiessen polygon side set is obtained based on the road boundary obtained after the equi-spaced point forming, the Thiessen polygon side outside the road boundary obtained after the equi-spaced point forming is deleted from the first Thiessen polygon side set, to obtain the second Thiessen polygon side set, the buffer region of the road boundary is obtained, the third Thiessen polygon side set is obtained based on the Thiessen polygon side that is in the second Thiessen polygon side set and that does not intersect the buffer region of the road boundary, a dangling line is deleted from the third Thiessen polygon side set to obtain the fourth Thiessen polygon side set, and the fourth Thiessen polygon side set is connected to obtain the road center line of the region through which the vehicle has traveled. The intersection region, the lane boundary, and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining, based on the road boundary and the road center line, an intersection region of the region through which the vehicle has traveled includes:
- obtaining a center point of each intersection based on the road center line;
- determining a circle whose circle center is the center point of each intersection and whose radius is a pre-stored first length as a center point buffer region of each intersection;
- performing, on sub-road center lines, an operation of deleting a sub-road center line whose length is less than a pre-stored second length, to obtain each road section center line, where each sub-road center line is a remaining road center line outside the center point buffer region of each intersection in the road center line;
- obtaining each road section center line buffer region based on each road section center line and a pre-stored second width; and
- performing, on sub-intersection regions, an operation of deleting a sub-intersection region whose area is less than a pre-stored first area, to obtain the intersection region of the region through which the vehicle has traveled, where each sub-intersection region is a remaining intersection region outside each road section center line buffer region in a plane including the road boundary.

It can be learned that, in this example, the center point of each intersection is obtained, the center point buffer region of each intersection is obtained, each road section center line is obtained, each road section center line buffer region is obtained based on each road section center line, and the sub-intersection region whose area is less than the pre-stored first area is deleted from the sub-intersection regions, to obtain the intersection region of the region through which the vehicle has traveled. The lane boundary and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining, based on the road boundary, the road center line, and the intersection region, a lane boundary of the region through which the vehicle has traveled includes:
  obtaining road section boundaries outside the intersection region in the road boundary;
  obtaining road section center lines outside the intersection region in the road center line;
  determining, based on the road section boundaries and the road section center lines, whether each of road sections is a single-lane section or a dual-lane section, where the road sections are in a one-to-one correspondence with the road section boundaries and the road section center lines;
  if a road section A is the single-lane section, determining a road section boundary corresponding to the road section A as a lane boundary of a single-lane section through which the vehicle has traveled, where the road section A is any one of all single-lane sections included in the road sections; and
  if a road section B is the dual-lane section, determining a road section boundary and a road section center line that correspond to the road section B as lane boundaries of a dual-lane section through which the vehicle has traveled, where the road section B is any one of all dual-lane sections included in the road sections.

It can be learned that, in this example, the road section boundaries are obtained, the road section center lines are obtained, whether each of the road sections is the single-lane section or the dual-lane section is determined based on the road section boundaries and the road section center lines, if a road section A is the single-lane section, the road section boundary corresponding to the road section A is determined as the lane boundary of the single-lane section through which the vehicle has traveled, and if the road section B is the dual-lane section, the road section boundary and the road section center line that correspond to the road section B are determined as the lane boundaries of the dual-lane section through which the vehicle has traveled. The lane center line of the region through which the vehicle has traveled is obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining road traffic direction information based on the manual driving track data and the road information includes:
  obtaining a manual driving track and first relative angle difference sets of road sections based on the manual driving track data and the road center line, where the first relative angle difference sets are in a one-to-one correspondence with the road sections;
  if a variance of a first relative angle difference set C is less than a pre-stored first angle, determining that a road section corresponding to the first relative angle difference set C is a one-way section, where the first relative angle difference set C is any one of all first relative angle difference sets that are included in the first relative angle difference sets and whose variances are less than the first angle; and
  if an average value of the first relative angle difference set C is less than a pre-stored second angle, determining that a road traffic direction of the road section corresponding to the first relative angle difference set C is a forward traffic direction; or
  if the average value of the first relative angle difference set C is greater than or equal to the second angle, determining that the road traffic direction of the road section corresponding to the first relative angle difference set C is a reverse traffic direction.

In some possible embodiments, the method further includes:
  if a variance of a first relative angle difference set D is greater than or equal to the first angle, determining that a road section corresponding to the first relative angle difference D is a two-way section, where the first relative angle difference set D is any one of all first relative angle difference sets that are included in the first relative angle difference sets and whose variances are greater than or equal to the first angle.

It can be learned that, in this example, the manual driving track and the first relative angle difference sets of the road sections are obtained, if the variance of the first relative angle difference set C is less than the pre-stored first angle, it is determined that the road section corresponding to the first relative angle difference set C is the one-way section, and if the average value of the first relative angle difference set C is less than the pre-stored second angle, it is determined that the road traffic direction of the road section corresponding to the first relative angle difference set C is the forward traffic direction, or if the average value of the first relative angle difference set C is greater than or equal to the second angle, it is determined that the road traffic direction of the road section corresponding to the first relative angle difference set C is the reverse traffic direction. If the variance of the first relative angle difference set D is greater than or equal to the first angle, it is determined that the road section corresponding to the first relative angle difference D is the two-way section. The lane traffic direction information is obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining lane traffic direction information based on the lane information and the road traffic direction information includes:

if a road section E obtained based on the lane information and the road traffic direction information is a two-way dual-lane section, obtaining two second relative angle difference sets of two lane center lines of the road section E based on a road section center line corresponding to the road section E, where the road section E is any one of all two-way dual-lane sections included in the road sections;

if an average value of a second relative angle difference set F is less than a pre-stored third angle, determining whether a lane center line corresponding to the second relative angle difference set F intersects a right buffer region of the road section center line corresponding to the road section E, where the second relative angle difference set F is either of the two second relative angle difference sets; and if the lane center line corresponding to the second relative angle difference set F intersects the right buffer region of the road section center line corresponding to the road section E, determining that a lane traffic direction of a lane on which the lane center line corresponding to the second relative angle difference set F is located is a forward traffic direction, or if the lane center line corresponding to the second relative angle difference set F does not intersect the right buffer region of the road section center line corresponding to the road section E, determining that the lane traffic direction of the lane on which the lane center line corresponding to the second relative angle difference set F is located is a reverse traffic direction; and if an average value of a second relative angle difference set G is greater than or equal to the third angle, determining whether a lane center line corresponding to the second relative angle difference set G intersects a left buffer region of the road section center line corresponding to the road section E, where the second relative angle difference set G is either of the two second relative angle difference sets; and if the lane center line corresponding to the second relative angle difference set G intersects the left buffer region of the road section center line corresponding to the road section E, determining that a lane traffic direction of a lane on which the lane center line corresponding to the second relative angle difference set G is located is a forward traffic direction, or if the lane center line corresponding to the second relative angle difference set G does not intersect the left buffer region of the road section center line corresponding to the road section E, determining that the lane traffic direction of the lane on which the lane center line corresponding to the second relative angle difference set G is located is a reverse traffic direction.

In some possible embodiments, the method further includes:

if a road section H obtained based on the lane information and the road traffic direction information is a two-way single-lane section, determining that a lane traffic direction of the road section H is two-way, where the road section H is any one of all two-way single-lane sections included in the road sections; and if a road section I obtained based on the lane information and the road traffic direction information is a one-way single-lane section, determining a road traffic direction of the road section I as a lane traffic direction of the road section I, where the road section I is any one of all one-way single-lane sections included in the road sections.

It can be learned that, in this example, if the road section E is the two-way dual-lane section, the two second relative angle difference sets of the two lane center lines of the road section E are obtained based on the road section center line corresponding to the road section E, if the average value of the second relative angle difference set F is less than the pre-stored third angle, it is determined whether the lane center line corresponding to the second relative angle difference set F intersects the right buffer region of the road section center line corresponding to the road section E; and if the lane center line corresponding to the second relative angle difference set F intersects the right buffer region of the road section center line corresponding to the road section E, it is determined that the lane traffic direction of the lane on which the lane center line corresponding to the second relative angle difference set F is located is the forward traffic direction, or if the lane center line corresponding to the second relative angle difference set F does not intersect the right buffer region of the road section center line corresponding to the road section E, it is determined that the lane traffic direction of the lane on which the lane center line corresponding to the second relative angle difference set F is located is the reverse traffic direction, and if the average value of the second relative angle difference set G is greater than or equal to the third angle, it is determined whether the lane center line corresponding to the second relative angle difference set G intersects the left buffer region of the road section center line corresponding to the road section E; and if the lane center line corresponding to the second relative angle difference set G intersects the left buffer region of the road section center line corresponding to the road section E, it is determined that the lane traffic direction of the lane on which the lane center line corresponding to the second relative angle difference set G is located is the forward traffic direction, or if the lane center line corresponding to the second relative angle difference set G does not intersect the left buffer region of the road section center line corresponding to the road section E, it is determined that the lane traffic direction of the lane on which the lane center line corresponding to the second relative angle difference set G is located is the reverse traffic direction. If the road section H is the two-way single-lane section, it is determined that the lane traffic direction of the road section H is two-way, and if the road section I is the one-way single-lane section, the road traffic direction of the road section I is determined as the lane traffic direction of the road section I. The intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, the obtaining intersection entry and exit point information based on the intersection information and the lane traffic direction information includes:

obtaining a start formed point and an end formed point of a lane center line J, where the lane center line J is any one of all lane center lines included in the road sections;

obtaining a buffer region of each intersection region based on each intersection region and a pre-stored third width;

if a formed point K intersects a buffer region of an intersection region L, determining that the formed point L belongs to the intersection region L, where the formed point K is either of the start formed point and the end formed point of the lane center line J, and the intersection region L is any one of the intersection regions; and if a lane traffic direction of a lane on which the lane center line J is located is a forward traffic direction, determining the start formed point of the lane center line J as an end formed point of the virtual topology center line, and determining the end formed point of the lane center line J as a start formed point of the virtual topology center line; or if the lane traffic direction of the lane on which the lane center line J is located is a reverse traffic direction, determining the start formed point of the lane center line J as the start formed point of the virtual topology center line, and determining the end formed point of the lane center line J as the end formed point of the virtual topology center line; or if the lane traffic direction of the lane on which the lane center line J is located is two-way, determining the start formed point of the lane center line J as the start formed point of the virtual topology center line, and determining the end formed point of the lane center line J as the end formed point of the virtual topology center line; or determining the start formed point of the lane center line J as the end formed point of the virtual topology center line, and determining the end formed point of the lane center line J as the start formed point of the virtual topology center line.

It can be learned that, in this example, the start formed point and the end formed point of the lane center line J are obtained, the buffer region of each intersection region is obtained based on each intersection region, if the formed point K intersects the buffer region of the intersection region L, it is determined that the formed point L belongs to the intersection region L, and if the lane traffic direction of the lane on which the lane center line J is located is the forward traffic direction, the start formed point of the lane center line J is determined as the end formed point of the virtual topology center line, and the end formed point of the lane center line J is determined as the start formed point of the virtual topology center line; or if the lane traffic direction of the lane on which the lane center line J is located is the reverse traffic direction, the start formed point of the lane center line J is determined as the start formed point of the virtual topology center line, and the end formed point of the lane center line J is determined as the end formed point of the virtual topology center line; or if the lane traffic direction of the lane on which the lane center line J is located is two-way, the start formed point of the lane center line J is determined as the start formed point of the virtual topology center line, and the end formed point of the lane center line J is determined as the end formed point of the virtual topology center line; or the start formed point of the lane center line J is determined as the end formed point of the virtual topology center line, and the end formed point of the lane center line J is determined as the start formed point of the virtual topology center line. The operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

According to a second aspect, an embodiment of this application provides an autonomous driving map construction apparatus, including:

an obtaining unit, configured to obtain, based on manual driving track data and/or an obstacle grid map, road information, intersection information, and lane information of a region through which a vehicle has traveled, where the obtaining unit is further configured to obtain road traffic direction information based on the manual driving track data and the road information;

the obtaining unit is further configured to obtain lane traffic direction information based on the lane information and the road traffic direction information; and the obtaining unit is further configured to obtain intersection entry and exit point information based on the intersection information and the lane traffic direction information; and an execution unit, configured to perform, based on the intersection entry and exit point information, an operation of generating a virtual topology center line to obtain an autonomous driving map of the region through which the vehicle has traveled, where the virtual topology center line is a traveling boundary line of the vehicle in an intersection region.

According to a third aspect, this application provides an autonomous driving map construction apparatus. The apparatus includes a processor, a communications interface, and a memory that are coupled to each other.

The processor is configured to obtain, based on manual driving track data and/or an obstacle grid map, road information, intersection information, and lane information of a region through which a vehicle has traveled.

The processor is further configured to: obtain road traffic direction information based on the manual driving track data and the road information, and obtain lane traffic direction information based on the lane information and the road traffic direction information.

The processor is further configured to obtain intersection entry and exit point information based on the intersection information and the lane traffic direction information.

The processor is further configured to perform, based on the intersection entry and exit point information, an operation of generating a virtual topology center line to obtain an autonomous driving map of the region through which the vehicle has traveled, where the virtual topology center line is a traveling boundary line of the vehicle in an intersection region.

According to a fourth aspect, this application provides a computer-readable storage medium. The computer-readable storage medium stores computer instructions, and the computer program is executed by hardware (for example, a processor) to implement some or all of the steps of any method performed by the autonomous driving map construction apparatus in embodiments of this application.

According to a fifth aspect, an embodiment of this application provides a computer program product. When the computer program product runs on a computer, the computer is enabled to perform some or all of the steps of the autonomous driving map construction method in the foregoing aspects.

According to a sixth aspect, an embodiment of this application provides a chip system. The chip system includes a processor, configured to support an electronic device in implementing some or all of the steps of the autonomous driving map construction method in the foregoing aspects.

BRIEF DESCRIPTION OF DRAWINGS

To describe the technical solutions in embodiments of this application or in the background more clearly, the following briefly describes the accompanying drawings for describing embodiments of this application or the background.

FIG. 1O is a schematic flowchart of obtaining lane communication direction information according to an embodiment of this application;

DESCRIPTION OF EMBODIMENTS

The following describes embodiments of this application with reference to the accompanying drawings in embodiments of this application. Terms used in implementations of embodiments of this application are merely used to explain exemplary embodiments of this application, and are not intended to limit this application.

Figure 1A:
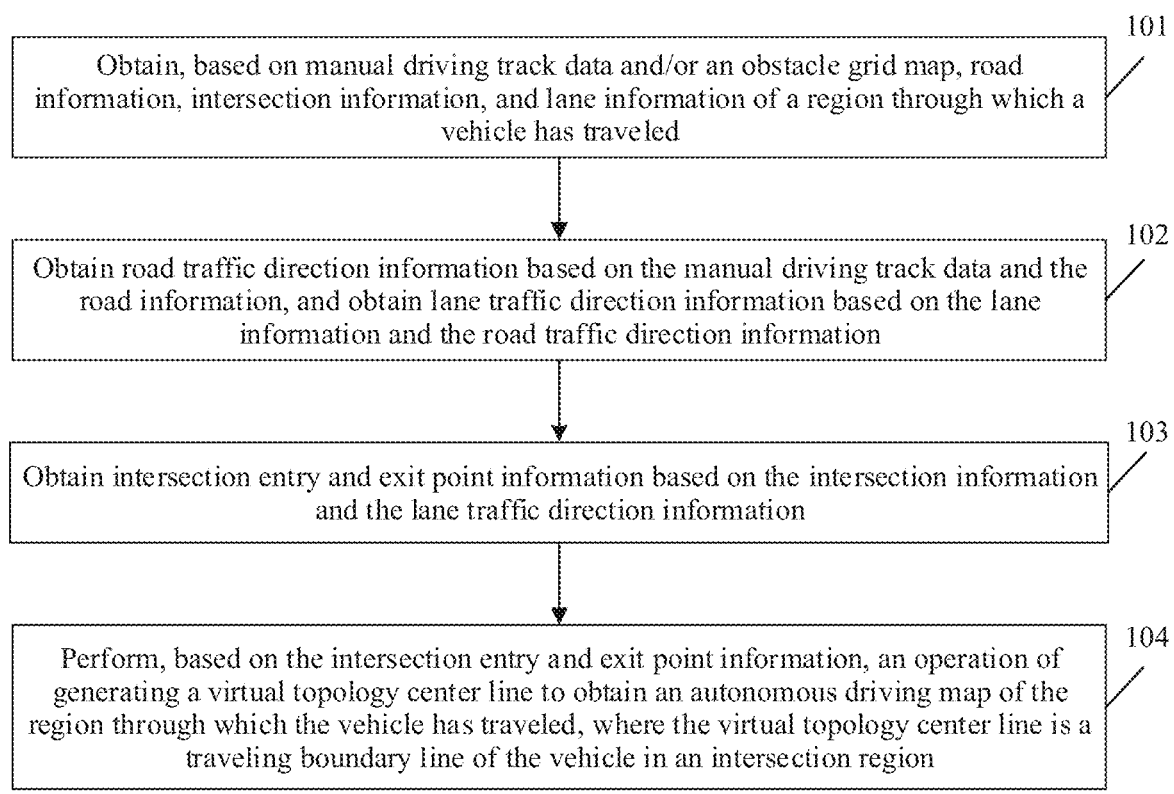
FIG. 1A is a schematic flowchart of a first autonomous driving map construction method according to an embodiment of this application.

FIG. 1A shows a first autonomous driving map construction method according to an embodiment of this application. The autonomous driving map construction method includes steps 101 to 104. Details are as follows:

101: An autonomous driving map construction apparatus obtains, based on manual driving track data and/or an obstacle grid map, road information, intersection information, and lane information of a region through which a vehicle has traveled.

The autonomous driving map construction apparatus obtains, based on the manual driving track data, the road information, the intersection information, and the lane information of the region through which the vehicle has traveled;

or the autonomous driving map construction apparatus obtains, based on the manual driving track data and the obstacle grid map, the road information, the intersection information, and the lane information of the region through which the vehicle has traveled.

Figure 1B:
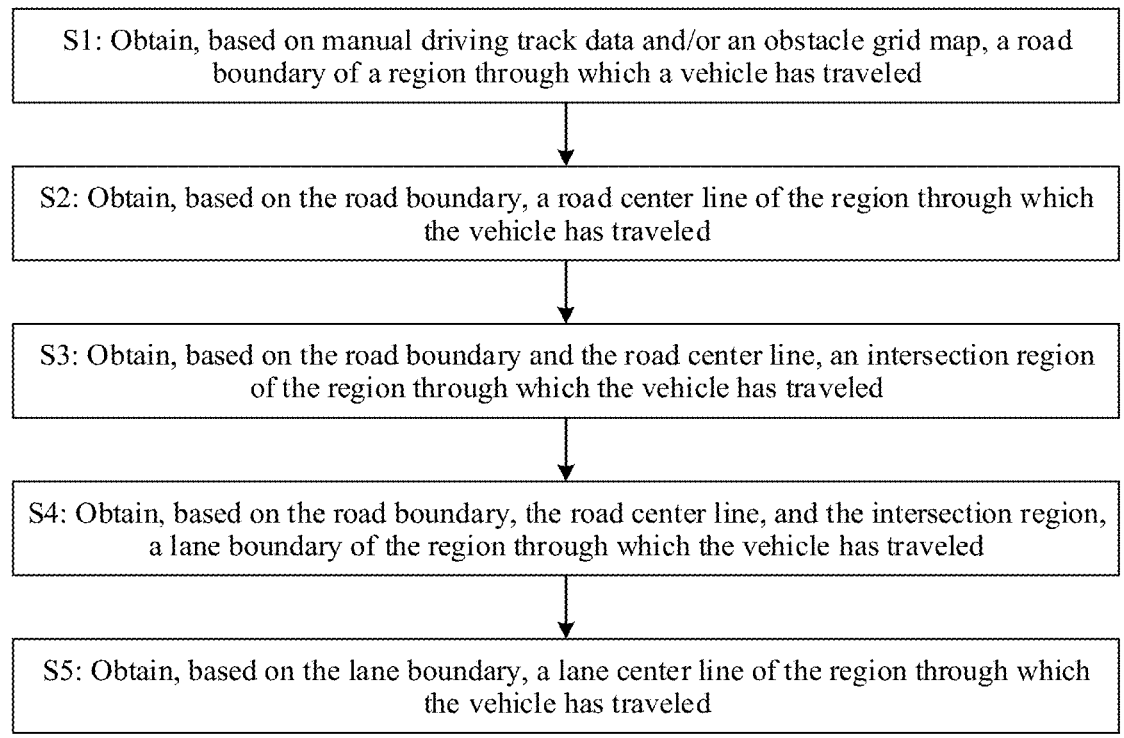
FIG. 1B is a schematic flowchart of obtaining road information, intersection information, and lane information of a region through which a vehicle has traveled according to an embodiment of this application.

In some possible embodiments, as shown in FIG. 1B, that an autonomous driving map construction apparatus obtains, based on manual driving track data and/or an obstacle grid map, road information, intersection information, and lane information of a region through which a vehicle has traveled includes steps S1 to S5. Details are as follows:

S1: The autonomous driving map construction apparatus obtains, based on the manual driving track data and/or the obstacle grid map, a road boundary of the region through which the vehicle has traveled.

S2: The autonomous driving map construction apparatus obtains, based on the road boundary, a road center line of the region through which the vehicle has traveled.

S3: The autonomous driving map construction apparatus obtains, based on the road boundary and the road center line, an intersection region of the region through which the vehicle has traveled.

S4: The autonomous driving map construction apparatus obtains, based on the road boundary, the road center line, and the intersection region, a lane boundary of the region which the vehicle has traveled.

S5: The autonomous driving map construction apparatus obtains, based on the lane boundary, a lane center line of the region through which the vehicle has traveled.

The autonomous driving map construction apparatus obtains, based on the manual driving track data, the road boundary of the region through which the vehicle has traveled; or the autonomous driving map construction apparatus obtains, based on the manual driving track data and the obstacle grid map, the road boundary of the region through which the vehicle has traveled.

It can be learned that, in this example, the road boundary, the road center line, the intersection region, the lane boundary, and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

Figure 1C:
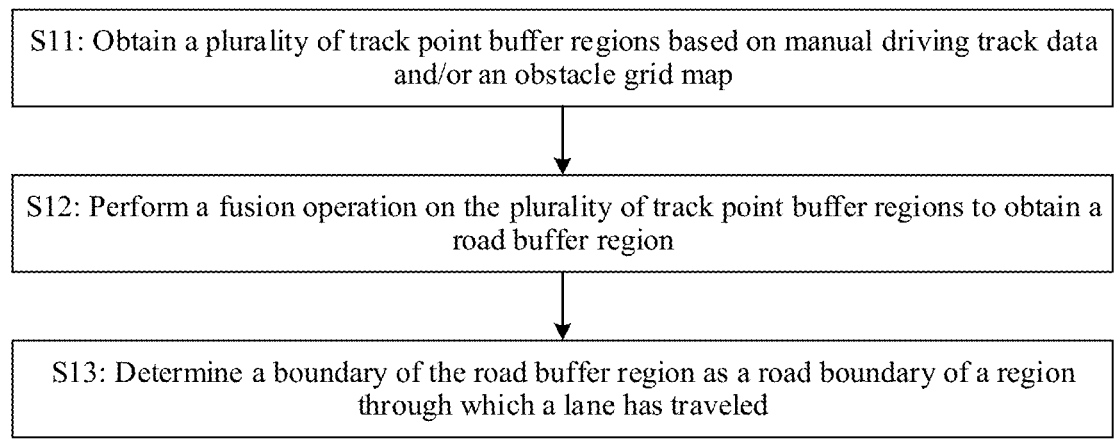
FIG. 1C is a schematic flowchart of obtaining a road boundary of a region through which a vehicle has traveled according to an embodiment of this application.

In some possible embodiments, as shown in FIG. 1C, that the autonomous driving map construction apparatus obtains, based on the manual driving track data and/or the obstacle grid map, a road boundary of the region through which the vehicle has traveled includes steps S11 to S13. Details are as follows:

S11: The autonomous driving map construction apparatus obtains a plurality of track point buffer regions based on the manual driving track data and/or the obstacle grid map.

Figure 1D:
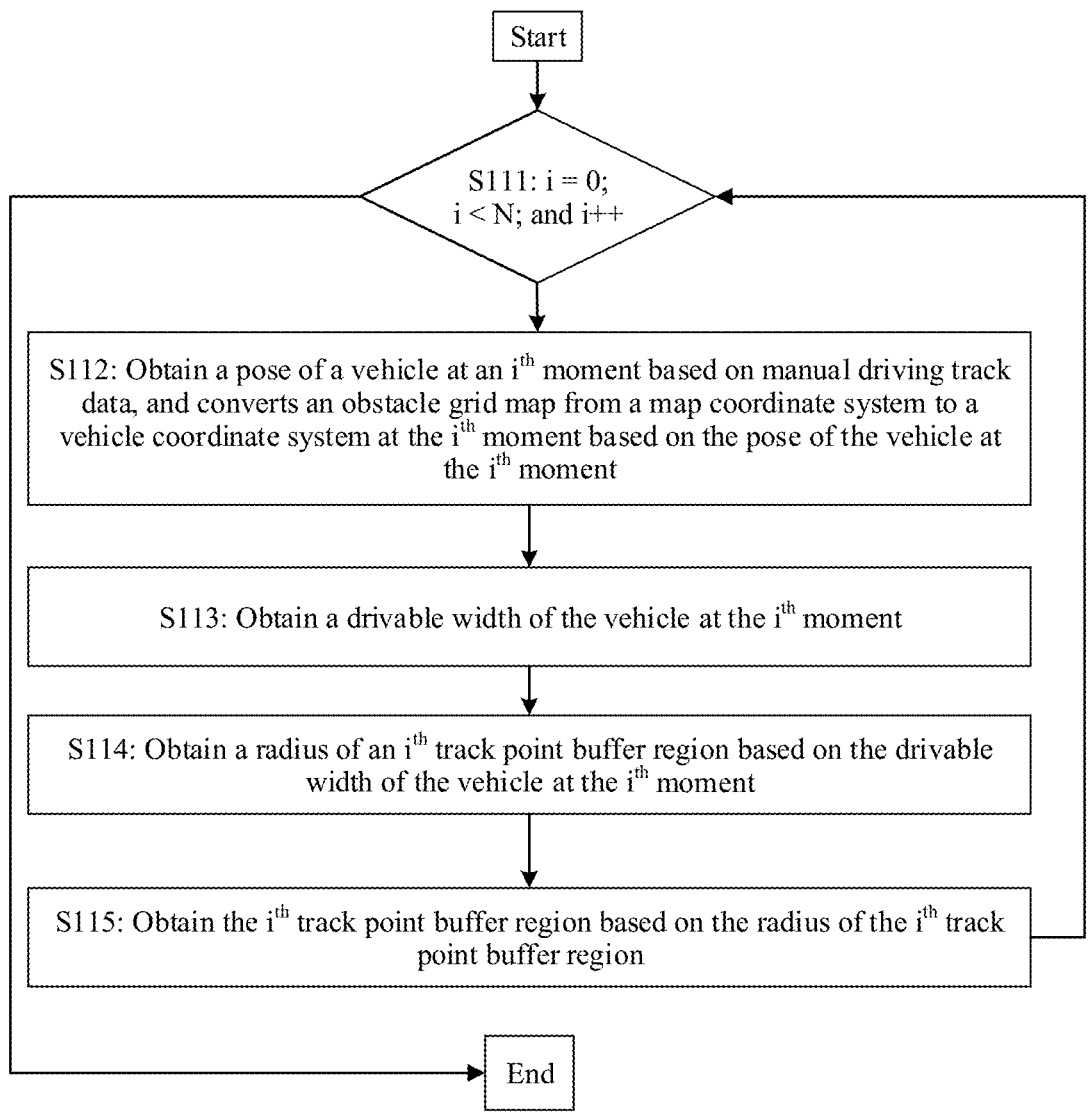
FIG. 1D is a schematic flowchart of obtaining a plurality of track point buffer regions according to an embodiment of this application.

In some embodiments, as shown in FIG. 1D, that the autonomous driving map construction apparatus obtains a plurality of track point buffer regions based on the manual driving track data and/or the obstacle grid map includes steps S111 to S115. Details are as follows:

S111: The autonomous driving map construction apparatus sets i to an increasing integer with an initial value of 0 and an interval of 1, and determines whether i is less than N.

If i is less than N, the autonomous driving map construction apparatus performs steps S112 to S115.

If i is not less than N, the autonomous driving map construction apparatus does not perform any operation.

N is a total quantity of first track points, and the total quantity of first track points is obtained based on the manual driving track data.

S112: The autonomous driving map construction apparatus obtains a pose of the vehicle at an $i^{th}$ moment based on the manual driving track data, and converts the obstacle grid map from a map coordinate system to a vehicle coordinate system at the $i^{th}$ moment based on the pose of the vehicle at the $i^{th}$ moment.

The pose of the vehicle at the $i^{th}$ moment includes an x-axis coordinate, a y-axis coordinate, a z-axis coordinate, a yaw angle, a pitch angle, and a roll angle of the vehicle at the $i^{th}$ moment in the map coordinate system.

When the autonomous driving map construction apparatus obtains the plurality of track point buffer regions based on the manual driving track data, the autonomous driving map construction apparatus skips step S112.

S113: The autonomous driving map construction apparatus obtains a drivable width of the vehicle at the $i^{th}$ moment.

In some embodiments, that the autonomous driving map construction apparatus obtains a drivable width of the vehicle at the $i^{th}$ moment includes the following steps:

When the autonomous driving map construction apparatus obtains the plurality of track point buffer regions based on the manual driving track data and the obstacle grid map, the autonomous driving map construction apparatus obtains a maximum y-axis coordinate (y1) in which an obstacle probability is greater than a pre-stored first probability along a positive direction of the y-axis when a value of the x-axis coordinate is a distance between a head of the vehicle and an origin of the vehicle coordinate system at the $i^{th}$ moment. The autonomous driving map construction apparatus obtains a minimum y-axis coordinate (y2) in which the obstacle probability is greater than the first probability along a negative direction of the y-axis when the value of the x-axis coordinate is the distance between the head of the vehicle and the origin of the vehicle coordinate system at the $i^{th}$ moment. The autonomous driving map construction apparatus determines a sum of y1 and y2 as the drivable width of the vehicle at the $i^{th}$ moment.

Alternatively, when the autonomous driving map construction apparatus obtains the plurality of track point buffer regions based on the manual driving track data, the autonomous driving map construction apparatus obtains a width of the vehicle, and determines the width of the vehicle as the drivable width of the vehicle at the $i^{th}$ moment.

The first probability may be 0.5 to 0.9.

S114: The autonomous driving map construction apparatus obtains a radius of an $i^{th}$ track point buffer region based on the drivable width of the vehicle at the $i^{th}$ moment.

In some embodiments, that the autonomous driving map construction apparatus obtains a radius of an $i^{th}$ track point buffer region based on the drivable width of the vehicle at the $i^{th}$ moment includes the following steps:

The autonomous driving map construction apparatus obtains a nominal width of the vehicle.

The autonomous driving map construction apparatus determines whether the drivable width of the vehicle at the $i^{th}$ moment is greater than or equal to the nominal width of the vehicle.

If the drivable width of the vehicle at the i moment is greater than or equal to the nominal width of the vehicle, the autonomous driving map construction apparatus determines a half of the drivable width of the vehicle at the $i^{th}$ moment as the radius of the $i^{th}$ track point buffer region.

If the drivable width of the vehicle at the $i^{th}$ moment is not greater than or equal to the nominal width of the vehicle, the autonomous driving map construction apparatus determines a half of the nominal width of the vehicle as the radius of the $i^{th}$ track point buffer region.

The nominal width of the vehicle is a distance between left and right rearview mirrors of the vehicle.

S115: The autonomous driving map construction apparatus obtains the $i^{th}$ track point buffer region based on the radius of the $i^{th}$ track point buffer region.

In some embodiments, that the autonomous driving map construction apparatus obtains the $i^{th}$ track point buffer region based on the radius of the $i^{th}$ track point buffer region includes the following steps:

The autonomous driving map construction apparatus determines the x-axis coordinate and the y-axis coordinate of the vehicle at the $i^{th}$ moment (the origin of the vehicle coordinate system at the $i^{th}$ moment) in the map coordinate system as a circle center of the $i^{th}$ track point buffer region.

The autonomous driving map construction apparatus makes a circle based on the circle center and the radius of the $i^{th}$ track point buffer region, to obtain the $i^{th}$ track point buffer region.

S12: The autonomous driving map construction apparatus performs a fusion operation on the plurality of track point buffer regions to obtain a road buffer region.

In some embodiments, that the autonomous driving map construction apparatus performs a fusion operation on the plurality of track point buffer regions to obtain a road buffer region includes the following steps:

The autonomous driving map construction apparatus obtains an intersection region of any two adjacent track point buffer regions in the plurality of track point buffer regions.

The autonomous driving map construction apparatus performs a deletion operation on the intersection region that is of the any two adjacent track point buffer regions and that is included in one of the any two adjacent track point buffer regions, to obtain the road buffer region.

Figure 1E:
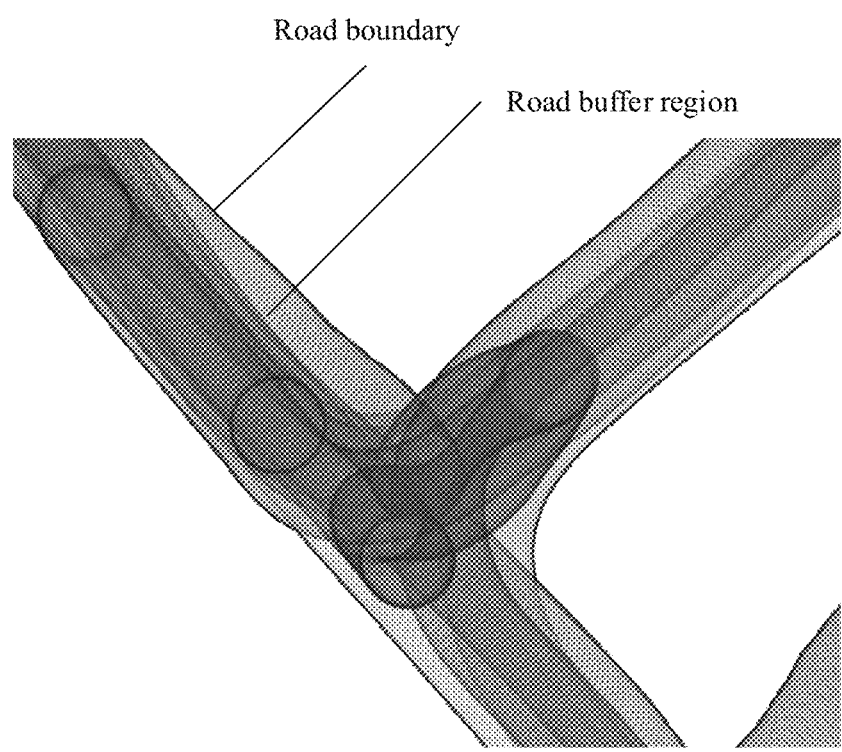
FIG. 1E is a schematic diagram of a road buffer region according to an embodiment of this application.

For example, FIG. 1E is a schematic diagram of a road buffer region according to an embodiment of this application. A region surrounded by a road boundary is the road buffer region.

S13: The autonomous driving map construction apparatus determines a boundary of the road buffer region as the road boundary of the region through which the lane has traveled.

The autonomous driving map construction apparatus obtains the plurality of track point buffer regions based on the manual driving track data; or the autonomous driving map construction apparatus obtains the plurality of track point buffer regions based on the manual driving track data and the obstacle grid map.

It can be learned that, in this example, the plurality of track point buffer regions are obtained, the plurality of track point buffer regions are fused to obtain the road buffer region, and the boundary of the road buffer region is determined as the road boundary of the region through which the vehicle has traveled. The road center line, the intersection region, the lane boundary, and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

Figure 1F:
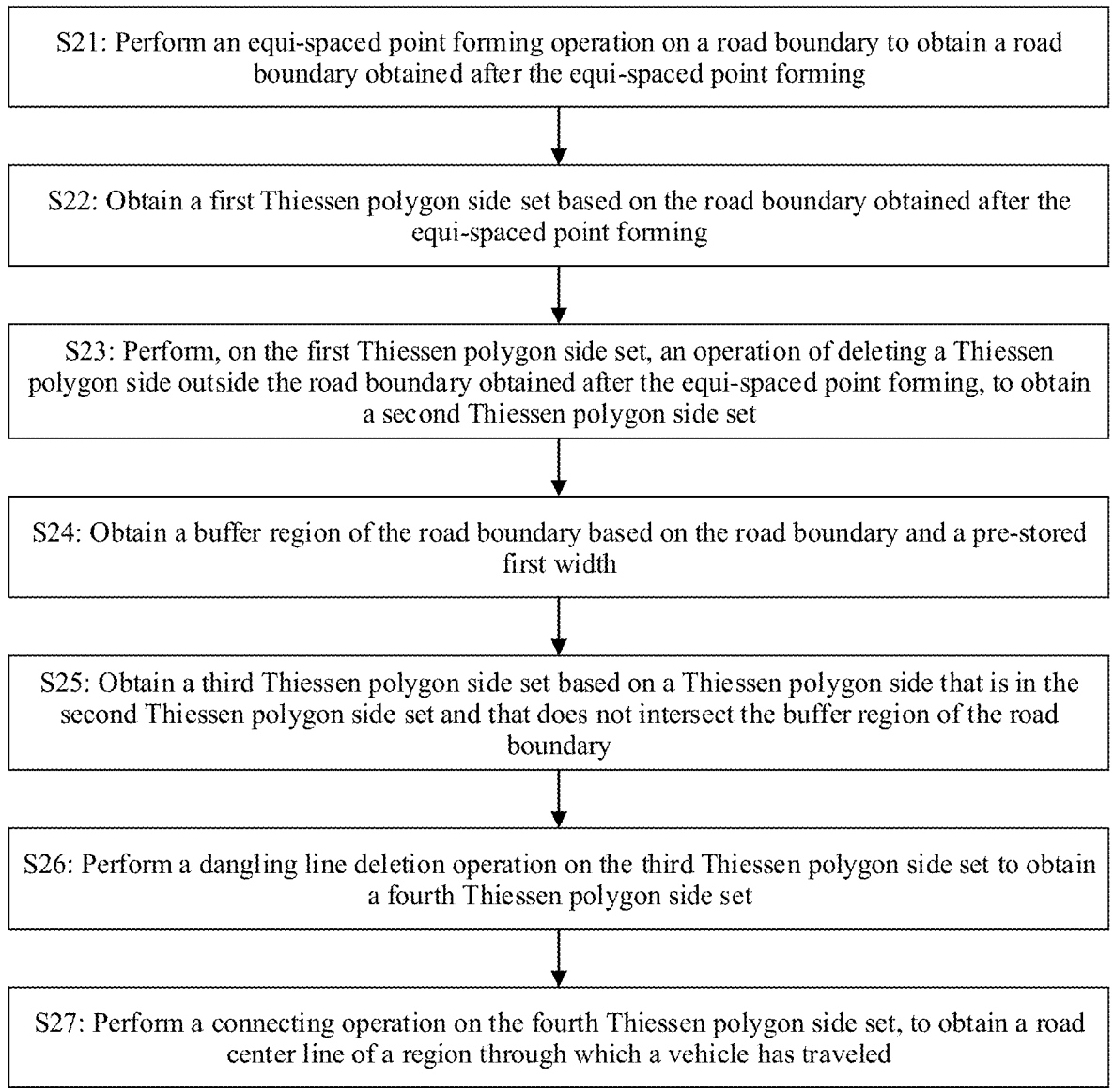
FIG. 1F is a schematic flowchart of obtaining a road center line of a region through which a vehicle has traveled according to an embodiment of this application.

In some possible embodiments, as shown in FIG. 1F, that the autonomous driving map construction apparatus obtains, based on the road boundary, a road center line of the region through which the vehicle has traveled includes steps S21 to S27. Details are as follows:

S21: The autonomous driving map construction apparatus performs an equi-spaced point forming operation on the road boundary to obtain a road boundary obtained after the equi-spaced point forming.

In some embodiments, that the autonomous driving map construction apparatus performs an equi-spaced point forming operation on the road boundary to obtain a road boundary obtained after the equi-spaced point forming includes the following steps:

The autonomous driving map construction apparatus obtains a distance between any adjacent current formed point and next formed point in all formed points included in the road boundary.

The autonomous driving map construction apparatus determines whether the distance between the any adjacent current formed point and next formed point is greater than a pre-stored first distance.

If the distance between the any adjacent current formed point and next formed point is greater than the pre-stored first distance, the autonomous driving map construction apparatus inserts, between the any adjacent current formed point and next formed point, a formed point whose distance from the current formed point is the first distance. If the distance between the any adjacent current formed point and next formed point is not greater than the pre-stored first distance (the distance between the any adjacent current formed point and next formed point is less than the first distance), the autonomous driving map construction apparatus performs a deletion operation on the next formed point to obtain the road boundary obtained after the equi-spaced point forming.

The first distance may be 0.2 m.

Figure 1G:
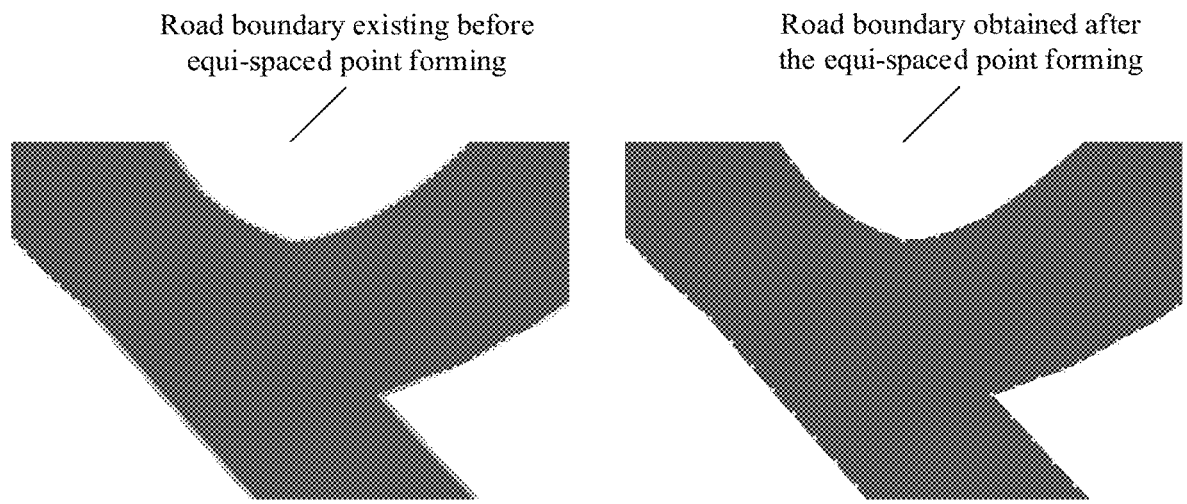
FIG. 1G is a schematic diagram of a road boundary existing before equi-spaced point forming and a road boundary obtained after the equi-spaced point forming according to an embodiment of this application.

For example, FIG. 1G is a schematic diagram of a road boundary existing before equi-spaced point forming and a road boundary obtained after the equi-spaced point forming according to an embodiment of this application. There is not necessarily a same distance between every any two adjacent formed points in all formed points included in the road boundary existing before the equi-spaced point forming, and there is definitely a same distance between every any two adjacent formed points in all formed points included in the road boundary obtained after the equi-spaced point forming.

S22: The autonomous driving map construction apparatus obtains a first Thiessen polygon side set based on the road boundary obtained after the equi-spaced point forming.

S23: The autonomous driving map construction apparatus performs, on the first Thiessen polygon side set, an operation of deleting a Thiessen polygon side outside the road boundary obtained after the equi-spaced point forming, to obtain a second Thiessen polygon side set.

S24: The autonomous driving map construction apparatus obtains a buffer region of the road boundary based on the road boundary and a pre-stored first width.

S25: The autonomous driving map construction apparatus obtains a third Thiessen polygon side set based on a Thiessen polygon side that is in the second Thiessen polygon side set and that does not intersect the buffer region of the road boundary.

S26: The autonomous driving map construction apparatus performs a dangling line deletion operation on the third Thiessen polygon side set to obtain a fourth Thiessen polygon side set.

A dangling line is a line segment in which one endpoint is not connected to another line and the other endpoint is connected to two or more lines.

S27: The autonomous driving map construction apparatus performs a connecting operation on the fourth Thiessen polygon side set, to obtain the road center line of the region through which the vehicle has traveled.

Figure 1H:
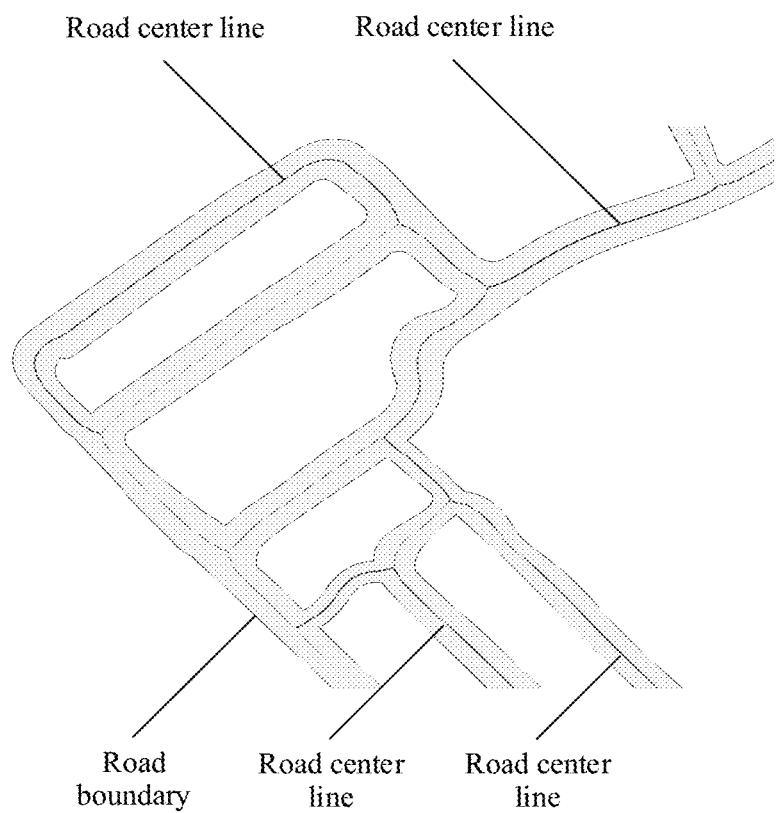
FIG. 1H is a schematic diagram of a road center line of a region through which a vehicle has traveled according to an embodiment of this application.

For example, FIG. 1H is a schematic diagram of a road center line of a region through which a vehicle has traveled according to an embodiment of this application. A line between road boundaries is the road center line.

It can be learned that, in this example, the first Thiessen polygon side set is obtained based on the road boundary obtained after the equi-spaced point forming, the Thiessen polygon side outside the road boundary obtained after the equi-spaced point forming is deleted from the first Thiessen polygon side set, to obtain the second Thiessen polygon side set, the buffer region of the road boundary is obtained, the third Thiessen polygon side set is obtained based on the Thiessen polygon side that is in the second Thiessen polygon side set and that does not intersect the buffer region of the road boundary, a dangling line is deleted from the third Thiessen polygon side set to obtain the fourth Thiessen polygon side set, and the fourth Thiessen polygon side set is connected to obtain the road center line of the region through which the vehicle has traveled. The intersection region, the lane boundary, and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

Figure 1I:
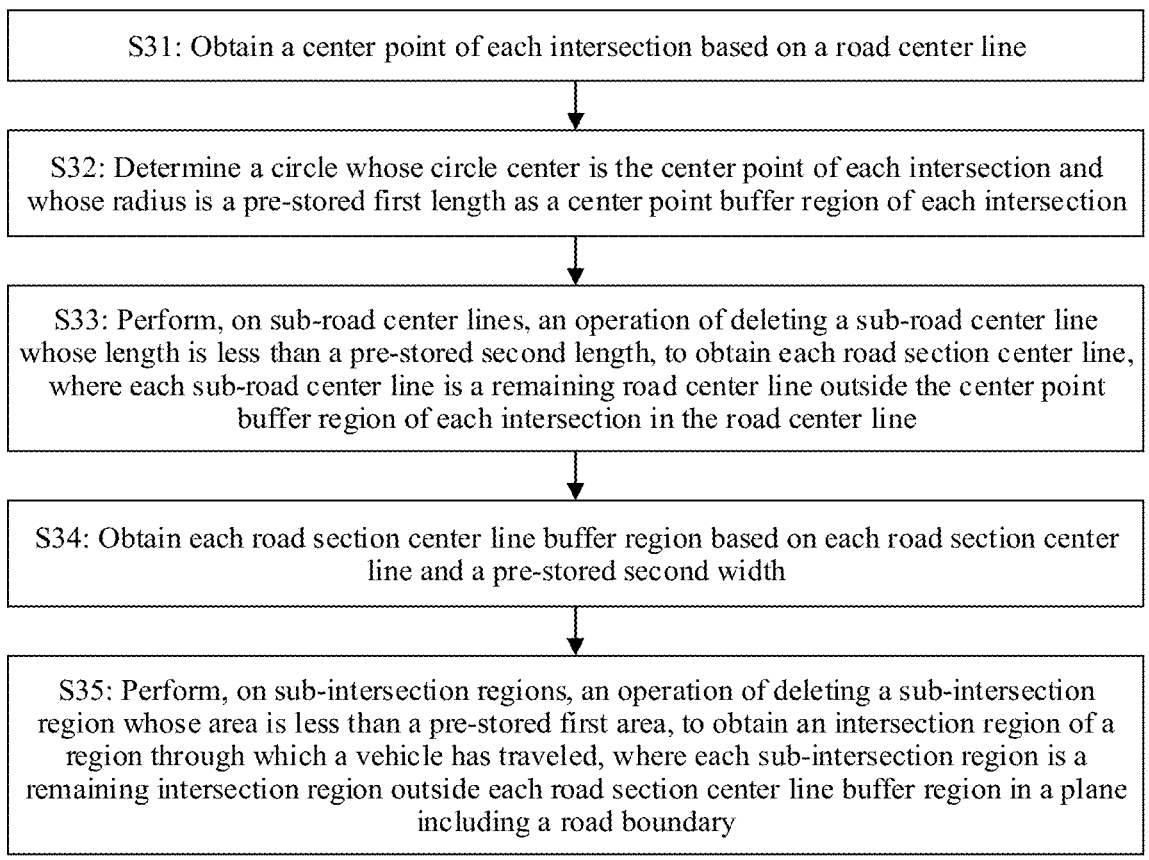
FIG. 1I is a schematic flowchart of obtaining an intersection region of a region through which a vehicle has traveled according to an embodiment of this application.

In some possible embodiments, as shown in FIG. 1I, that the autonomous driving map construction apparatus obtains, based on the road boundary and the road center line, an intersection region of the region through which the vehicle has traveled includes steps S31 to S35. Details are as follows:

S31: The autonomous driving map construction apparatus obtains a center point of each intersection based on the road center line.

The center point of each intersection is an intersection point of road center lines of regions through which the vehicle has traveled.

S32: The autonomous driving map construction apparatus determines a circle whose circle center is the center point of each intersection and whose radius is a pre-stored first length as a center point buffer region of each intersection.

The first length may be 5 m.

S33: The autonomous driving map construction apparatus performs, on sub-road center lines, an operation of deleting a sub-road center line whose length is less than a pre-stored second length, to obtain each road section center line, where each sub-road center line is a remaining road center line outside the center point buffer region of each intersection in the road center line.

The second length may be 10 m.

S34: The autonomous driving map construction apparatus obtains each road section center line buffer region based on each road section center line and a pre-stored second width.

The second width may be 3 m.

In some embodiments, that the autonomous driving map construction apparatus obtains each road section center line buffer region based on each road section center line and a pre-stored second width includes:

The autonomous driving map construction apparatus respectively extends the second width to two sides in a vertical direction of each road section center line, to obtain each road section center line buffer region.

S35: The autonomous driving map construction apparatus performs, on sub-intersection regions, an operation of deleting a sub-intersection region whose area is less than a pre-stored first area, to obtain the intersection region of the region through which the vehicle has traveled, where each sub-intersection region is a remaining intersection region outside each road section center line buffer region in a plane including the road boundary.

The first area may be 10 $m^2$.

Figure 1J:
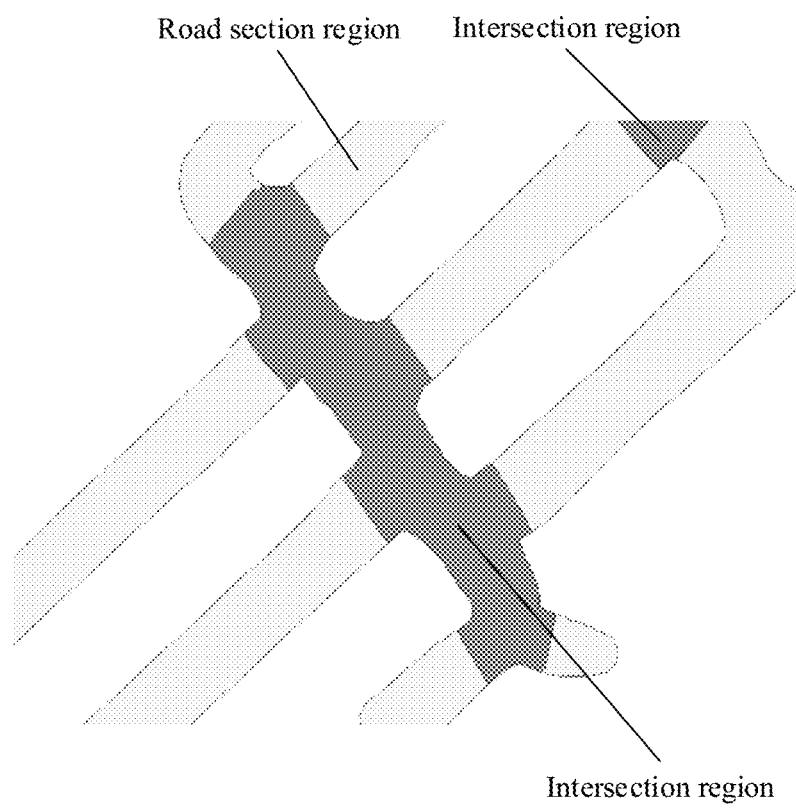
FIG. 1J is a schematic diagram of an intersection region of a region through which a vehicle has traveled according to an embodiment of this application.

For example, FIG. 1J is a schematic diagram of an intersection region of a region through which a vehicle has traveled according to an embodiment of this application. The region through which the vehicle has traveled includes a road section region and the intersection region.

It can be learned that, in this example, the center point of each intersection is obtained, the center point buffer region of each intersection is obtained, each road section center line is obtained, each road section center line buffer region is obtained based on each road section center line, and the sub-intersection region whose area is less than the pre-stored first area is deleted from the sub-intersection regions, to obtain the intersection region of the region through which the vehicle has traveled. The lane boundary and the lane center line of the region through which the vehicle has traveled are sequentially obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

Figure 1K:
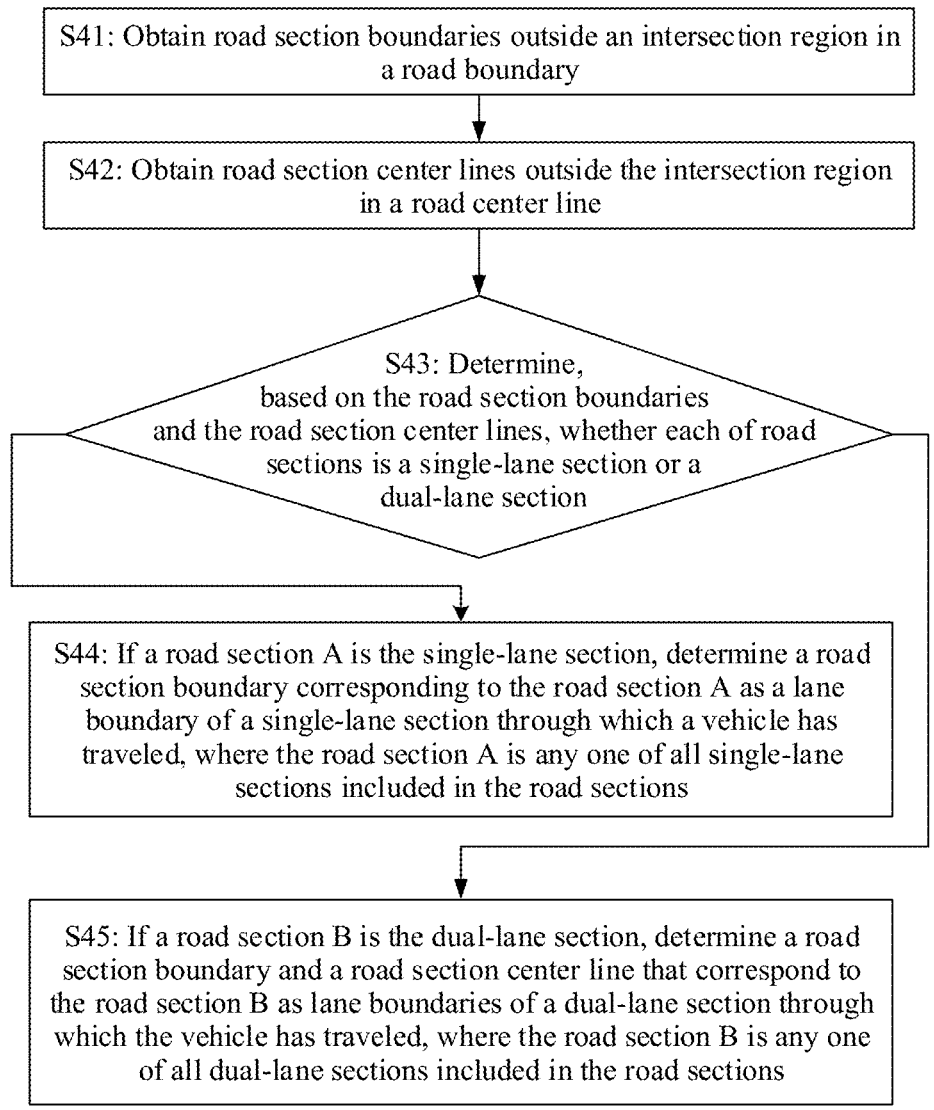
FIG. 1K is a schematic flowchart of obtaining a lane boundary of a region through which a vehicle has traveled according to an embodiment of this application.

In some possible embodiments, as shown in FIG. 1K, that the autonomous driving map construction apparatus obtains, based on the road boundary, the road center line, and the intersection region, a lane boundary of the region which the vehicle has traveled includes steps S41 to S45. Details are as follows:

S41: The autonomous driving map construction apparatus obtains road section boundaries outside the intersection region in the road boundary.

S42: The autonomous driving map construction apparatus obtains road section center lines outside the intersection region in the road center line.

S43: The autonomous driving map construction apparatus determines, based on the road section boundaries and the road section center lines, whether each of road sections is a single-lane section or a dual-lane section, where the road sections are in a one-to-one correspondence with the road section boundaries and the road section center lines.

Figure 1L:
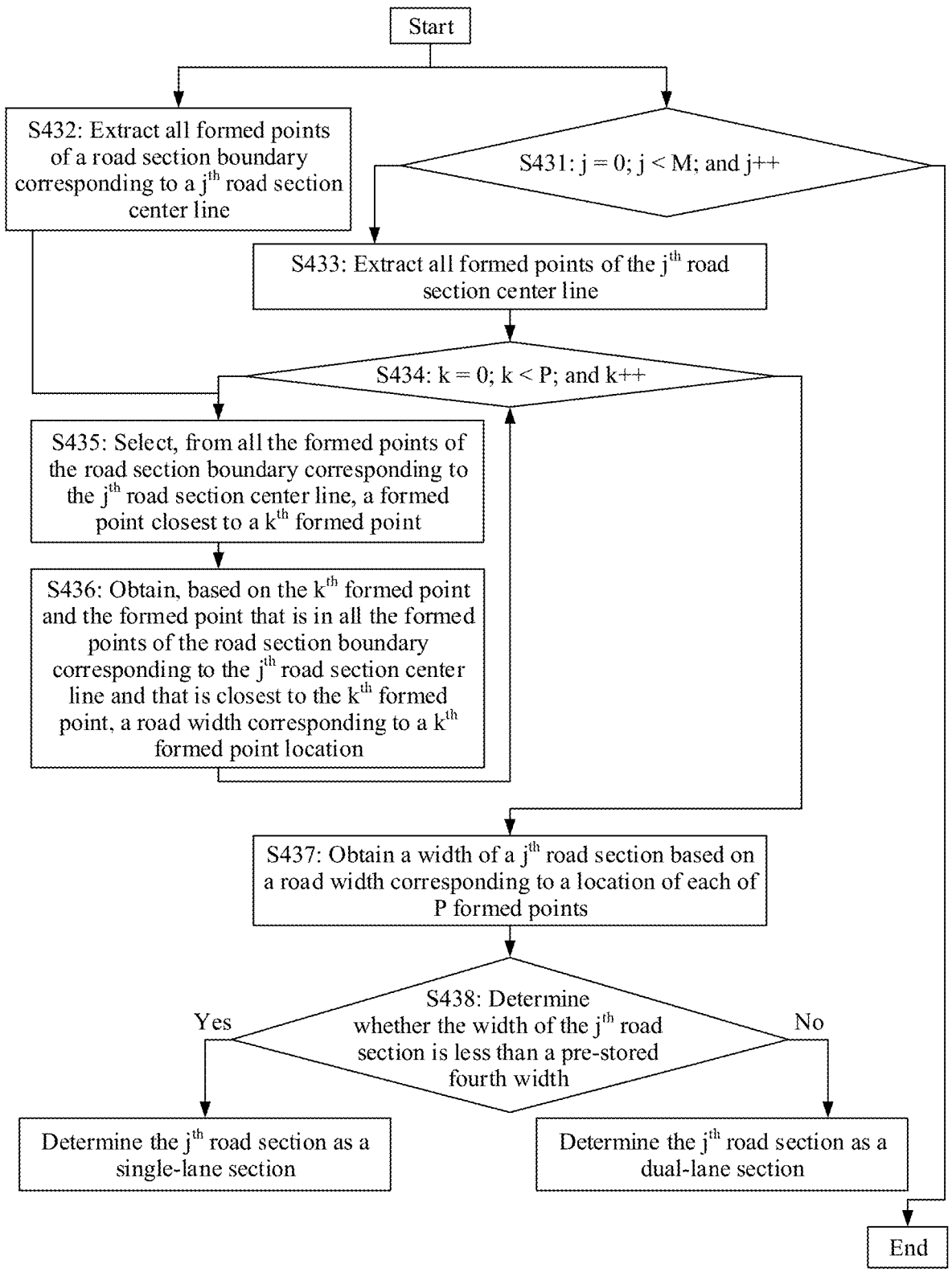
FIG. 1L is a schematic flowchart of determining whether each road section is a single-lane section or a dual-lane section according to an embodiment of this application.

In some embodiments, as shown in FIG. 1L, that the autonomous driving map construction apparatus determines, based on the road section boundaries and the road section center lines, whether each of road sections is a single-lane section or a dual-lane section includes steps S431 to S438. Details are as follows:

S431: The autonomous driving map construction apparatus sets j to an increasing integer with an initial value of 0 and an interval of 1, and determines whether j is less than M.

If j is less than M, the autonomous driving map construction apparatus performs steps S432 to S438.

If j is not less than M, the autonomous driving map construction apparatus does not perform any operation.

M is a quantity of road section center lines.

S432: The autonomous driving map construction apparatus extracts all formed points of a road section boundary corresponding to a $j^{th}$ road section center line.

S433: The autonomous driving map construction apparatus extracts all formed points of the $j^{th}$ road section center line.

S434: The autonomous driving map construction apparatus sets k to an increasing integer with an initial value of 0 and an interval of 1, and determines whether k is less than P.

If k is less than P, the autonomous driving map construction apparatus performs steps S435 and S436.

If k is not less than P, the autonomous driving map construction apparatus performs step S437.

P is a quantity of all formed points of the $j^{th}$ road section center line.

S435: The autonomous driving map construction apparatus selects, from all the formed points of the road section boundary corresponding to the $j^{th}$ road section center line, a formed point closest to a $k^{th}$ formed point.

S436: The autonomous driving map construction apparatus obtains, based on the $k^{th}$ formed point and the formed point that is in all the formed points of the road section boundary corresponding to the $j^{th}$ road section center line and that is closest to the $k^{th}$ formed point, a road width corresponding to a $k^{th}$ formed point location.

In some embodiments, that the autonomous driving map construction apparatus obtains a road width corresponding to a $k^{th}$ formed point location based on the $k^{th}$ formed point and the formed point that is in all the formed points of the road section boundary corresponding to the $j^{th}$ road section center line and that is closest to the $k^{th}$ formed point includes the following steps:

The autonomous driving map construction apparatus obtains coordinates of the $k^{th}$ formed point.

The autonomous driving map construction apparatus obtains coordinates of the formed point that is in all the formed points of the road section boundary corresponding to the $j^{th}$ road section center line and that is closest to the $k^{th}$ formed point.

The autonomous driving map construction apparatus obtains the road width corresponding to the $k^{th}$ formed point location based on the coordinates of the $k^{th}$ formed point and the coordinates of the formed point that is in all the formed points of the road section boundary corresponding to the $j^{th}$ road section center line and that is closest to the $k^{th}$ formed point and according to a pre-stored road width formula.

The road width formula is pre-stored in the autonomous driving map construction apparatus, and the road width formula is as follows:

$$s=[(x_3-x_4)^2+(y_3-y_4)^2]^{1/2}$$

Herein, s is the road width corresponding to the $k^{th}$ formed point location, $(x_3, y_3)$ is the coordinates of the $k^{th}$ formed point, and $(x_4, y_4)$ is the coordinates of the formed point that is in all the formed points of the road section boundary corresponding to the $j^{th}$ road section center line and that is closest to the $k^{th}$ formed point.

S437: The autonomous driving map construction apparatus obtains a width of a $j^{th}$ road section based on a road width corresponding to a location of each of the P formed points.

In some embodiments, that the autonomous driving map construction apparatus obtains a width of a $j^{th}$ road section based on a road width corresponding to a location of each of the P formed points includes the following steps:

The autonomous driving map construction apparatus obtains an average value of P road widths based on the road width corresponding to the location of each of the P formed points, where the P road widths are in a one-to-one correspondence with the P formed points. The autonomous driving map construction apparatus determines the average value of the P road widths as the width of the $j^{th}$ road section.

S438: The autonomous driving map construction apparatus determines whether the width of the $j^{th}$ road section is less than a pre-stored fourth width.

If the width of the $j^{th}$ road section is less than the pre-stored fourth width, the autonomous driving map construction apparatus determines the $j^{th}$ road section as the single-lane section.

If the width of the $j^{th}$ road section is not less than the pre-stored fourth width, the autonomous driving map construction apparatus determines the $j^{th}$ road section as the dual-lane section.

S44: If a road section A is the single-lane section, the autonomous driving map construction apparatus determines a road section boundary corresponding to the road section A as a lane boundary of a single-lane section through which the vehicle has traveled, where the road section A is any one of all single-lane sections included in the road sections.

S45: If a road section B is the dual-lane section, the autonomous driving map construction apparatus determines a road section boundary and a road section center line that correspond to the road section B as lane boundaries of a dual-lane section through which the vehicle has traveled, where the road section B is any one of all dual-lane sections included in the road sections.

It can be learned that, in this example, the road section boundaries are obtained, the road section center lines are obtained, whether each of the road sections is the single-lane section or the dual-lane section is determined based on the road section boundaries and the road section center lines, if a road section A is the single-lane section, the road section boundary corresponding to the road section A is determined as the lane boundary of the single-lane section through which the vehicle has traveled, and if the road section B is the dual-lane section, the road section boundary and the road section center line that correspond to the road section B are determined as the lane boundaries of the dual-lane section through which the vehicle has traveled. The lane center line of the region through which the vehicle has traveled is obtained, the road traffic direction information and the lane traffic direction information are separately obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

For a manner in which the autonomous driving map construction apparatus obtains, based on the lane boundary, the lane center line of the region through which the vehicle has traveled, refer to a manner in which the autonomous driving map construction apparatus obtains, based on the road boundary, the road center line of the region through which the vehicle has traveled. Details are not described herein again.

102: The autonomous driving map construction apparatus obtains road traffic direction information based on the manual driving track data and the road information, and obtains lane traffic direction information based on the lane information and the road traffic direction information.

Figure 1M:
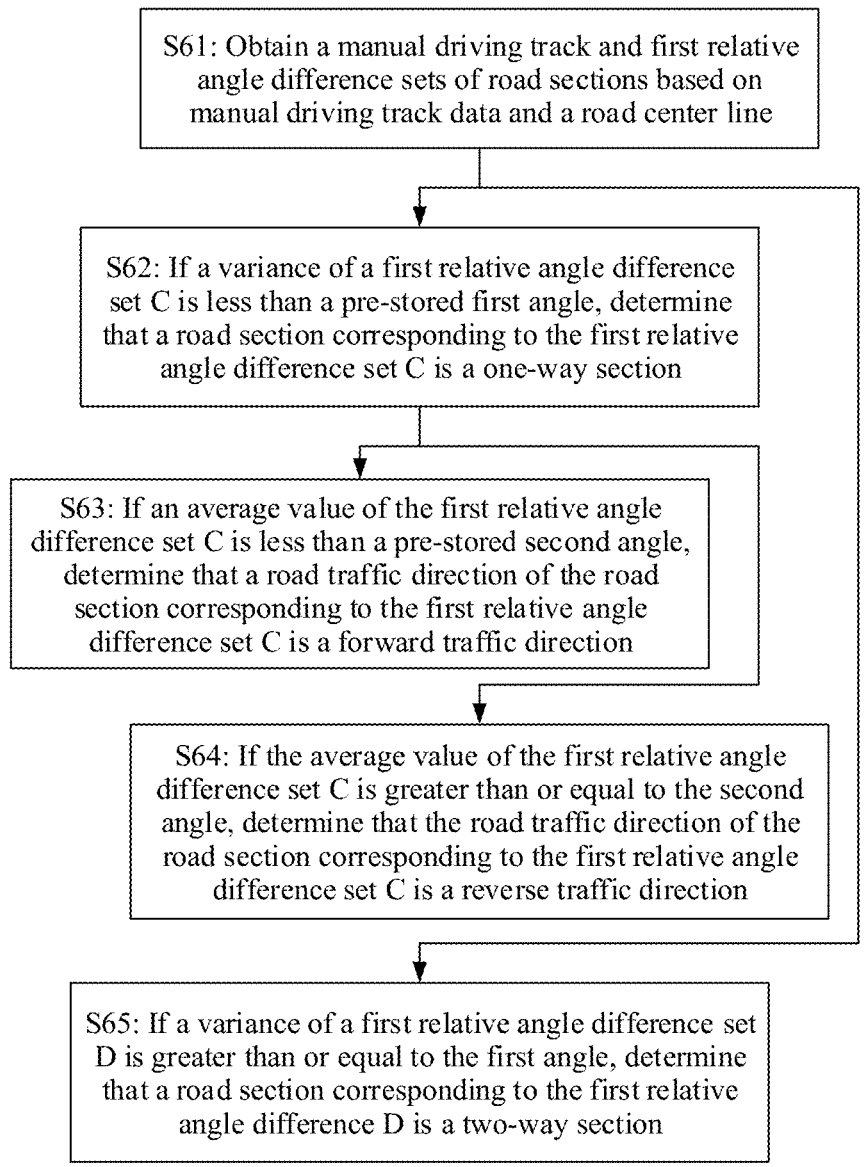
FIG. 1M is a schematic flowchart of obtaining road traffic direction information according to an embodiment of this application.

In some possible embodiments, as shown in FIG. 1M, that the autonomous driving map construction apparatus obtains road traffic direction information based on the manual driving track data and the road information includes steps S61 to S65. Details are as follows:

S61: The autonomous driving map construction apparatus obtains a manual driving track and first relative angle difference sets of road sections based on the manual driving track data and the road center line, where the first relative angle difference sets are in a one-to-one correspondence with the road sections.

Figure 1N:
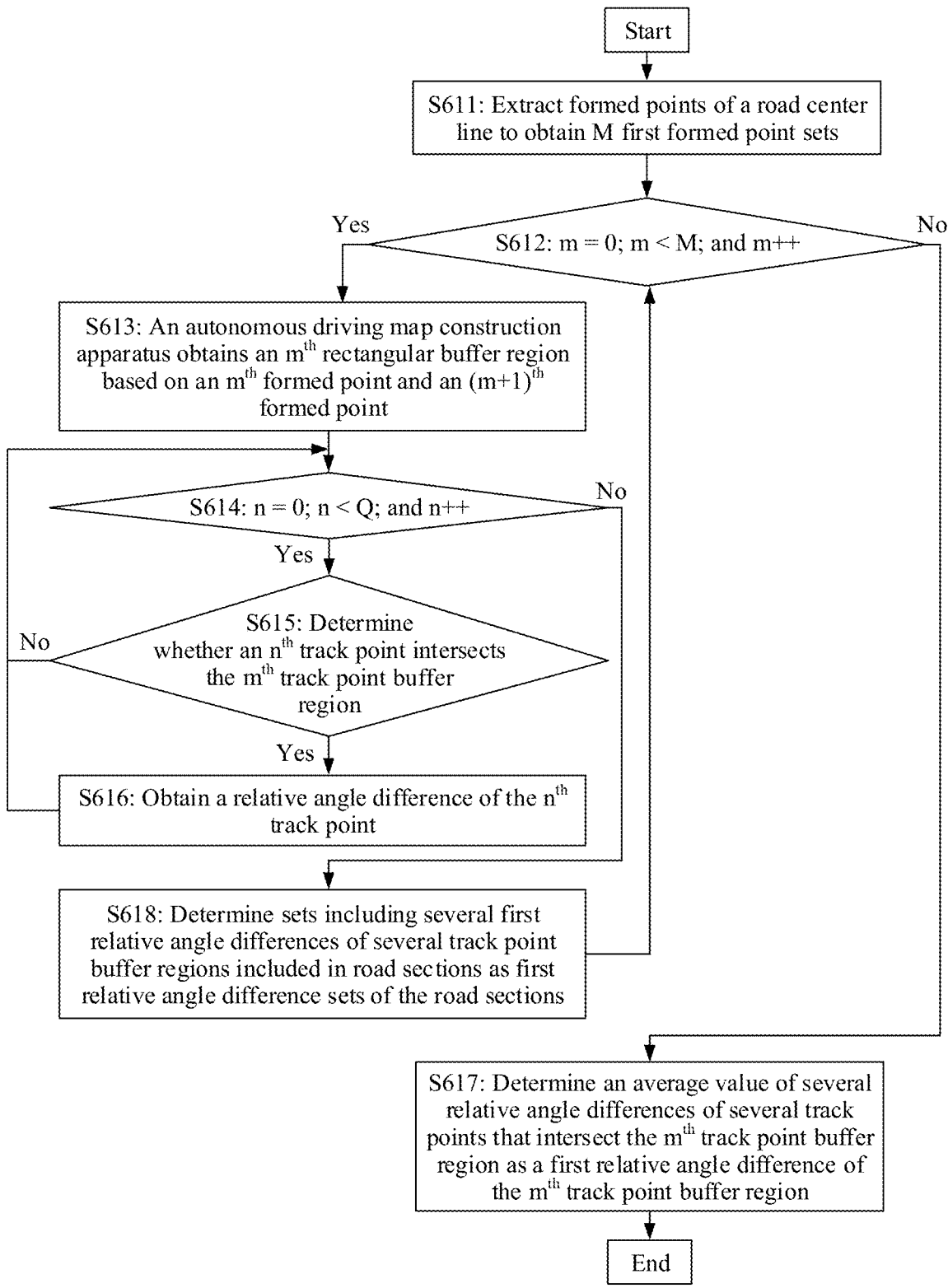
FIG. 1N is a schematic flowchart of obtaining a manual driving track and each first relative angle difference set of each road section according to an embodiment of this application.
Figure 10:
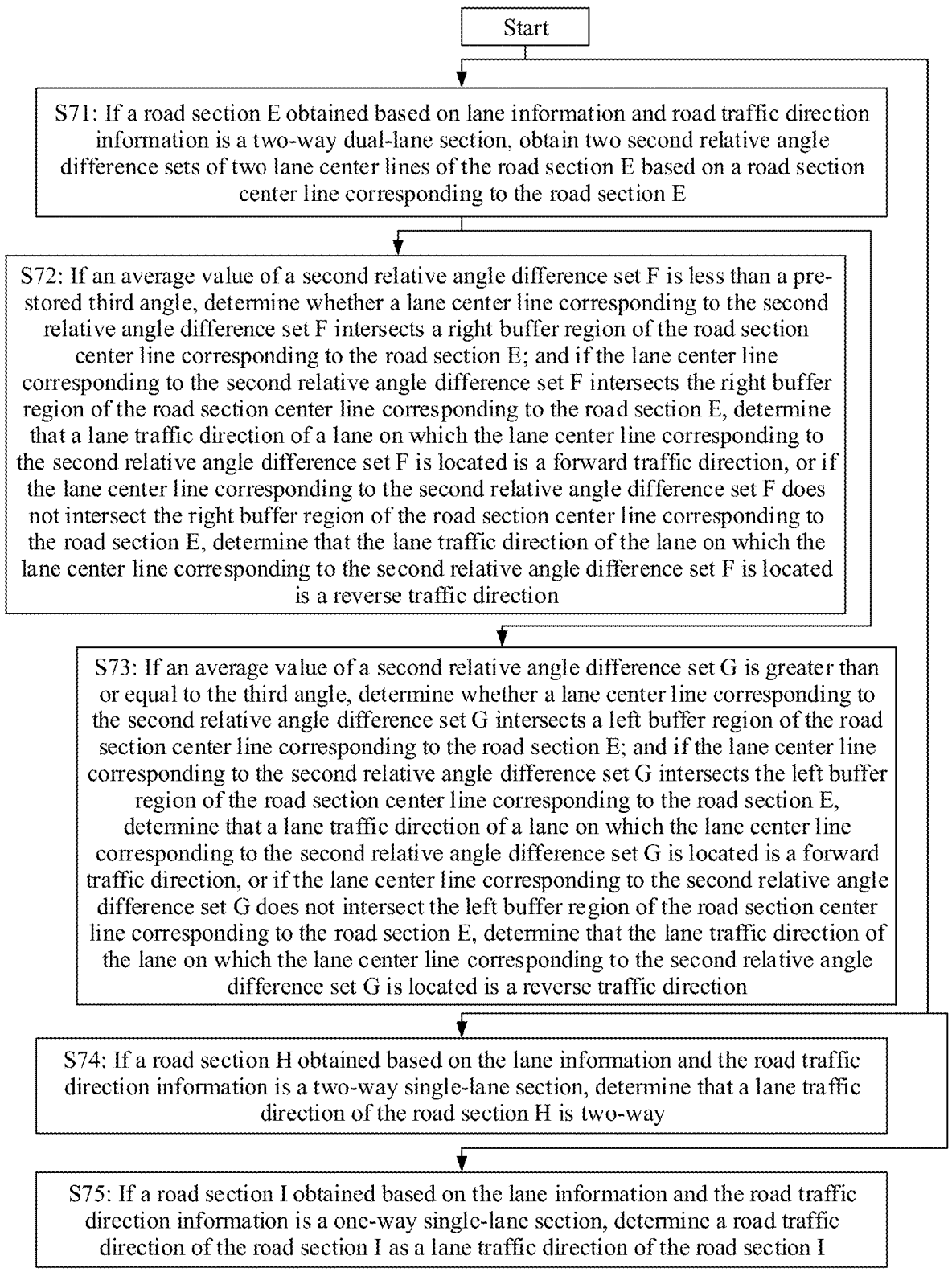

In some embodiments, as shown in FIG. 1N, that the autonomous driving map construction apparatus obtains a manual driving track and first relative angle difference sets of road sections based on the manual driving track data and the road center line includes steps S611 to S618. Details are as follows:

S611: The autonomous driving map construction apparatus extracts formed points of the road center line to obtain M first formed point sets.

M is a quantity of road sections.

S612: The autonomous driving map construction apparatus sets m to an increasing integer with an initial value of 0 and an interval of 1, and determines whether m is less than M.

If m is less than M, the autonomous driving map construction apparatus performs steps S613 to S617.

If m is not less than M, the autonomous driving map construction apparatus performs step S618.

S613: The autonomous driving map construction apparatus obtains an $m^{th}$ rectangular buffer region based on an $m^{th}$ formed point and an (m+1)th formed point.

In some embodiments, that the autonomous driving map construction apparatus obtains an $m^{th}$ rectangular buffer region based on an $m^{th}$ formed point and an (m+1)th formed point includes the following steps:

The autonomous driving map construction apparatus respectively extends a pre-stored fifth width to two sides in a direction that passes through the $m^{th}$ formed point and that is perpendicular to the road center line, to obtain two first endpoints.

The autonomous driving map construction apparatus respectively extends the fifth width to two sides in a direction that passes through the (m+1)th formed point and that is perpendicular to the road center line, to obtain two second endpoints.

The autonomous driving map construction apparatus connects the two first endpoints and the two second endpoints to obtain the $m^{th}$ matrix buffer region.

S614: The autonomous driving map construction apparatus sets n to an increasing integer with an initial value of 0 and an interval of 1, and determines whether n is less than Q.

If n is less than Q, the autonomous driving map construction apparatus performs step S615.

If n is not less than Q, the autonomous driving map construction apparatus performs step S617.

Q is a total quantity of second track points, and the total quantity of second track points is obtained based on the manual driving track data.

S615: The autonomous driving map construction apparatus determines whether an $n^{th}$ track point intersects the $m^{th}$ track point buffer region.

If the $n^{th}$ track point intersects the $m^{th}$ track point buffer region, the autonomous driving map construction apparatus performs step S616.

If the $n^{th}$ track point does not intersect the $m^{th}$ track point buffer region, the autonomous driving map construction apparatus performs step S614.

S616: The autonomous driving map construction apparatus obtains a relative angle difference of the $n^{th}$ track point.

In some embodiments, that the autonomous driving map construction apparatus obtains a relative angle difference of the $n^{th}$ track point includes the following steps:

The autonomous driving map construction apparatus calculates a heading angle of the $n^{th}$ track point.

The autonomous driving map construction apparatus obtains a heading angle of the $m^{th}$ formed point (an included angle between a due north direction and a line segment formed by connecting the $m^{th}$ formed point and the (m+1)th formed point).

The autonomous driving map construction apparatus determines a difference between the heading angle of the $n^{th}$ track point and the heading angle of the $m^{th}$ formed point as the relative angle difference of the $n^{th}$ track point.

S617: The autonomous driving map construction apparatus determines an average value of several relative angle differences of several track points that intersect the $m^{th}$ track point buffer region as a first relative angle difference of the $m^{th}$ track point buffer region, where the several relative angle differences are in a one-to-one correspondence with the several track points.

S618: The autonomous driving map construction apparatus determines sets including several first relative angle differences of several track point buffer regions included in the road sections as the first relative angle difference sets of the road sections, where the several first relative angle differences are in a one-to-one correspondence with the several track point buffer regions.

S62: If a variance of a first relative angle difference set C is less than a pre-stored first angle, the autonomous driving map construction apparatus determines that a road section corresponding to the first relative angle difference set C is a one-way section, where the first relative angle difference set C is any one of all first relative angle difference sets that are included in the first relative angle difference sets and whose variances are less than the first angle.

S63: If an average value of the first relative angle difference set C is less than a pre-stored second angle, the autonomous driving map construction apparatus determines that a road traffic direction of the road section corresponding to the first relative angle difference set C is a forward traffic direction.

S64: If the average value of the first relative angle difference set C is greater than or equal to the second angle, the autonomous driving map construction apparatus determines that the road traffic direction of the road section corresponding to the first relative angle difference set C is a reverse traffic direction.

In some possible embodiments, the method further includes:

S65: If a variance of a first relative angle difference set D is greater than or equal to the first angle, the autonomous driving map construction apparatus determines that a road section corresponding to the first relative angle difference D is a two-way section, where the first relative angle difference set D is any one of all first relative angle difference sets that are included in the first relative angle difference sets and whose variances are greater than or equal to the first angle.

It can be learned that, in this example, the manual driving track and the first relative angle difference sets of the road sections are obtained, if the variance of the first relative angle difference set C is less than the pre-stored first angle, it is determined that the road section corresponding to the first relative angle difference set C is the one-way section, and if the average value of the first relative angle difference set C is less than the pre-stored second angle, it is determined that the road traffic direction of the road section corresponding to the first relative angle difference set C is the forward traffic direction, or if the average value of the first relative angle difference set C is greater than or equal to the second angle, it is determined that the road traffic direction of the road section corresponding to the first relative angle difference set C is the reverse traffic direction. If the variance of the first relative angle difference set D is greater than or equal to the first angle, it is determined that the road section corresponding to the first relative angle difference D is the two-way section. The lane traffic direction information is obtained, the intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

In some possible embodiments, as shown in FIG. 1O, that the autonomous driving map construction apparatus obtains lane traffic direction information based on the lane information and the road traffic direction information includes steps S71 to S75. Details are as follows:

S71: If a road section E obtained based on the lane information and the road traffic direction information is a two-way dual-lane section, the autonomous driving map construction apparatus obtains two second relative angle difference sets of two lane center lines of the road section E based on a road section center line corresponding to the road section E, where the road section E is any one of all two-way dual-lane sections included in the road sections.

For a manner in which the autonomous driving map construction apparatus obtains the two second relative angle difference sets of the two lane center lines of the road section E based on the road section center line corresponding to the road section E, refer to a manner in which the autonomous driving map construction apparatus obtains the manual driving track and the first relative angle difference sets of the road sections based on the manual driving track data and the road center line. Details are not described herein again.

S72: If an average value of a second relative angle difference set F is less than a pre-stored third angle, the autonomous driving map construction apparatus determines whether a lane center line corresponding to the second relative angle difference set F intersects a right buffer region of the road section center line corresponding to the road section E, where the second relative angle difference set F is either of the two second relative angle difference sets; and if the lane center line corresponding to the second relative angle difference set F intersects the right buffer region of the road section center line corresponding to the road section E, the autonomous driving map construction apparatus determines that a lane traffic direction of a lane on which the lane center line corresponding to the second relative angle difference set F is located is a forward traffic direction, or if the lane center line corresponding to the second relative angle difference set F does not intersect the right buffer region of the road section center line corresponding to the road section E, the autonomous driving map construction apparatus determines that the lane traffic direction of the lane on which the lane center line corresponding to the second relative angle difference set F is located is a reverse traffic direction.

S73: If an average value of a second relative angle difference set G is greater than or equal to the third angle, the autonomous driving map construction apparatus determines whether a lane center line corresponding to the second relative angle difference set G intersects a left buffer region of the road section center line corresponding to the road section E, where the second relative angle difference set G is either of the two second relative angle difference sets; and if the lane center line corresponding to the second relative angle difference set G intersects the left buffer region of the road section center line corresponding to the road section E, the autonomous driving map construction apparatus determines that a lane traffic direction of a lane on which the lane center line corresponding to the second relative angle difference set G is located is a forward traffic direction, or if the lane center line corresponding to the second relative angle difference set G does not intersect the left buffer region of the road section center line corresponding to the road section E, the autonomous driving map construction apparatus determines that the lane traffic direction of the lane on which the lane center line corresponding to the second relative angle difference set G is located is a reverse traffic direction.

In some possible embodiments, the method further includes:

S74: If a road section H obtained based on the lane information and the road traffic direction information is a two-way single-lane section, the autonomous driving map construction apparatus determines that a lane traffic direction of the road section H is two-way, where the road section H is any one of all two-way single-lane sections included in the road sections.

S75: If a road section I obtained based on the lane information and the road traffic direction information is a one-way single-lane section, the autonomous driving map construction apparatus determines a road traffic direction of the road section I as a lane traffic direction of the road section I, where the road section I is any one of all one-way single-lane sections included in the road sections.

It can be learned that, in this example, if the road section E is the two-way dual-lane section, the two second relative angle difference sets of the two lane center lines of the road section E are obtained based on the road section center line corresponding to the road section E, if the average value of the second relative angle difference set F is less than the pre-stored third angle, it is determined whether the lane center line corresponding to the second relative angle difference set F intersects the right buffer region of the road section center line corresponding to the road section E; and if the lane center line corresponding to the second relative angle difference set F intersects the right buffer region of the road section center line corresponding to the road section E, it is determined that the lane traffic direction of the lane on which the lane center line corresponding to the second relative angle difference set F is located is the forward traffic direction, or if the lane center line corresponding to the second relative angle difference set F does not intersect the right buffer region of the road section center line corresponding to the road section E, it is determined that the lane traffic direction of the lane on which the lane center line corresponding to the second relative angle difference set F is located is the reverse traffic direction, and if the average value of the second relative angle difference set G is greater than or equal to the third angle, it is determined whether the lane center line corresponding to the second relative angle difference set G intersects the left buffer region of the road section center line corresponding to the road section E; and if the lane center line corresponding to the second relative angle difference set G intersects the left buffer region of the road section center line corresponding to the road section E, it is determined that the lane traffic direction of the lane on which the lane center line corresponding to the second relative angle difference set G is located is the forward traffic direction, or if the lane center line corresponding to the second relative angle difference set G does not intersect the left buffer region of the road section center line corresponding to the road section E, it is determined that the lane traffic direction of the lane on which the lane center line corresponding to the second relative angle difference set G is located is the reverse traffic direction. If the road section H is the two-way single-lane section, it is determined that the lane traffic direction of the road section H is two-way, and if the road section I is the one-way single-lane section, the road traffic direction of the road section I is determined as the lane traffic direction of the road section I. The intersection entry and exit point information is obtained, and the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

103: The autonomous driving map construction apparatus obtains intersection entry and exit point information based on the intersection information and the lane traffic direction information.

Figure 1P:
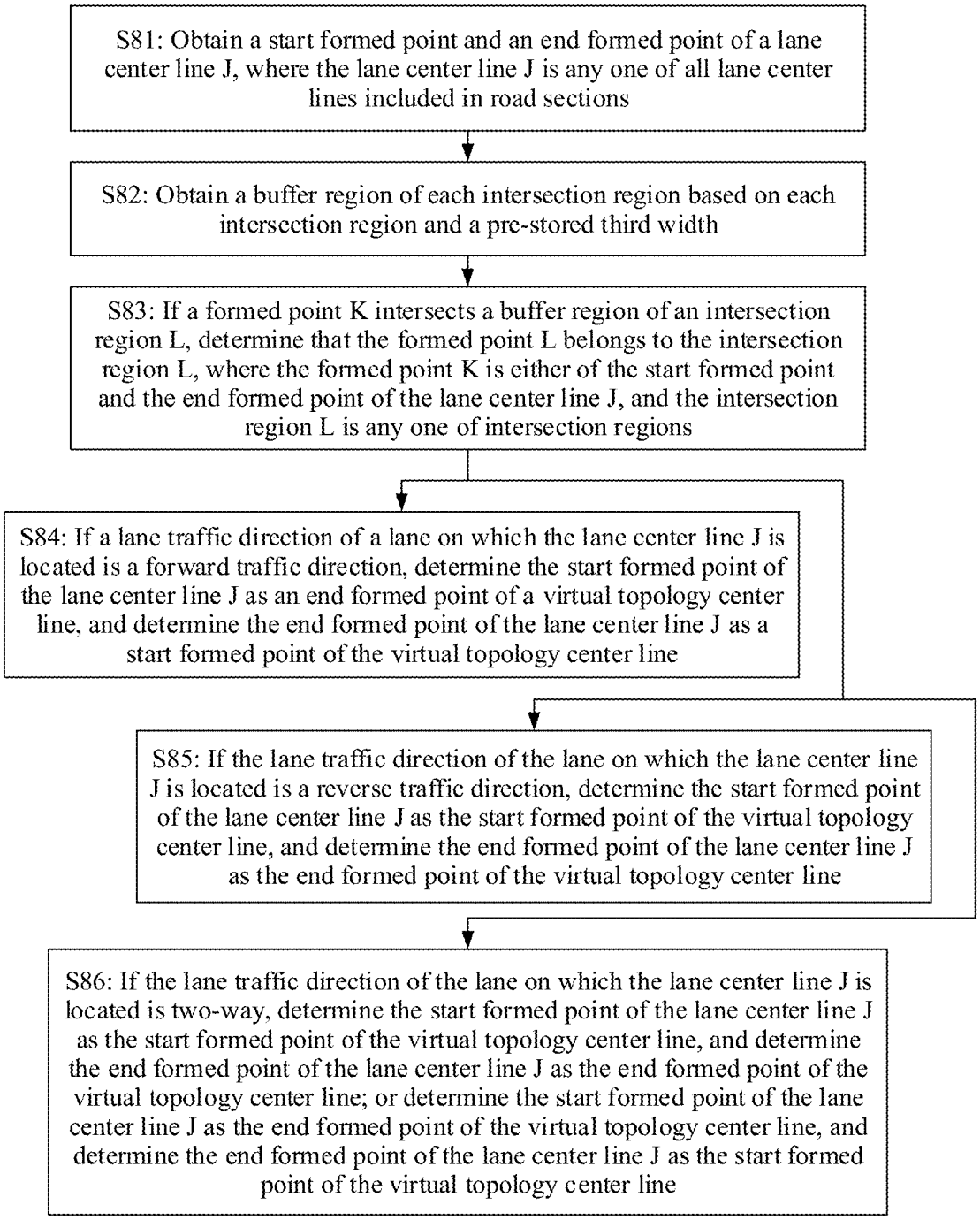
FIG. 1P is a schematic flowchart of obtaining intersection entry and exit point information according to an embodiment of this application.

In some possible embodiments, as shown in FIG. 1P, that the autonomous driving map construction apparatus obtains intersection entry and exit point information based on the intersection information and the lane traffic direction information includes steps S81 to S86. Details are as follows:

S81: The autonomous driving map construction apparatus obtains a start formed point and an end formed point of a lane center line J, where the lane center line J is any one of all lane center lines included in the road sections.

S82: The autonomous driving map construction apparatus obtains a buffer region of each intersection region based on each intersection region and a pre-stored third width.

S83: If a formed point K intersects a buffer region of an intersection region L, the autonomous driving map construction apparatus determines that the formed point L belongs to the intersection region L, where the formed point K is either of the start formed point and the end formed point of the lane center line J, and the intersection region L is any one of the intersection regions.

S84: If a lane traffic direction of a lane on which the lane center line J is located is a forward traffic direction, the autonomous driving map construction apparatus determines the start formed point of the lane center line J as an end formed point of the virtual topology center line, and determines the end formed point of the lane center line J as a start formed point of the virtual topology center line.

S85: If the lane traffic direction of the lane on which the lane center line J is located is a reverse traffic direction, the autonomous driving map construction apparatus determines the start formed point of the lane center line J as the start formed point of the virtual topology center line, and determines the end formed point of the lane center line J as the end formed point of the virtual topology center line.

S86: If the lane traffic direction of the lane on which the lane center line J is located is two-way, the autonomous driving map construction apparatus determines the start formed point of the lane center line J as the start formed point of the virtual topology center line, and determines the end formed point of the lane center line J as the end formed point of the virtual topology center line; or the autonomous driving map construction apparatus determines the start formed point of the lane center line J as the end formed point of the virtual topology center line, and determines the end formed point of the lane center line J as the start formed point of the virtual topology center line.

It can be learned that, in this example, the start formed point and the end formed point of the lane center line J are obtained, the buffer region of each intersection region is obtained based on each intersection region, if the formed point K intersects the buffer region of the intersection region L, it is determined that the formed point L belongs to the intersection region L, and if the lane traffic direction of the lane on which the lane center line J is located is the forward traffic direction, the start formed point of the lane center line J is determined as the end formed point of the virtual topology center line, and the end formed point of the lane center line J is determined as the start formed point of the virtual topology center line; or if the lane traffic direction of the lane on which the lane center line J is located is the reverse traffic direction, the start formed point of the lane center line J is determined as the start formed point of the virtual topology center line, and the end formed point of the lane center line J is determined as the end formed point of the virtual topology center line; or if the lane traffic direction of the lane on which the lane center line J is located is two-way, the start formed point of the lane center line J is determined as the start formed point of the virtual topology center line, and the end formed point of the lane center line J is determined as the end formed point of the virtual topology center line; or the start formed point of the lane center line J is determined as the end formed point of the virtual topology center line, and the end formed point of the lane center line J is determined as the start formed point of the virtual topology center line. The operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

104: The autonomous driving map construction apparatus performs, based on the intersection entry and exit point information, an operation of generating a virtual topology center line to obtain an autonomous driving map of the region through which the vehicle has traveled, where the virtual topology center line is a traveling boundary line of the vehicle in an intersection region.

In some embodiments, that the autonomous driving map construction apparatus performs, based on the intersection entry and exit point information, an operation of generating a virtual topology center line to obtain an autonomous driving map of the region through which the vehicle has traveled includes the following steps:

The autonomous driving map construction apparatus obtains all start formed points and all end nodes of virtual topology center lines of a same intersection region.

The autonomous driving map construction apparatus connects any one of all the start formed points to all remaining end nodes, to obtain the autonomous driving map of the region through which the vehicle has traveled.

All the virtual topology center lines of the intersection region may be Bezier curves, or may be other curves that meet vehicle kinematics. This is not limited herein.

Figure 1Q:
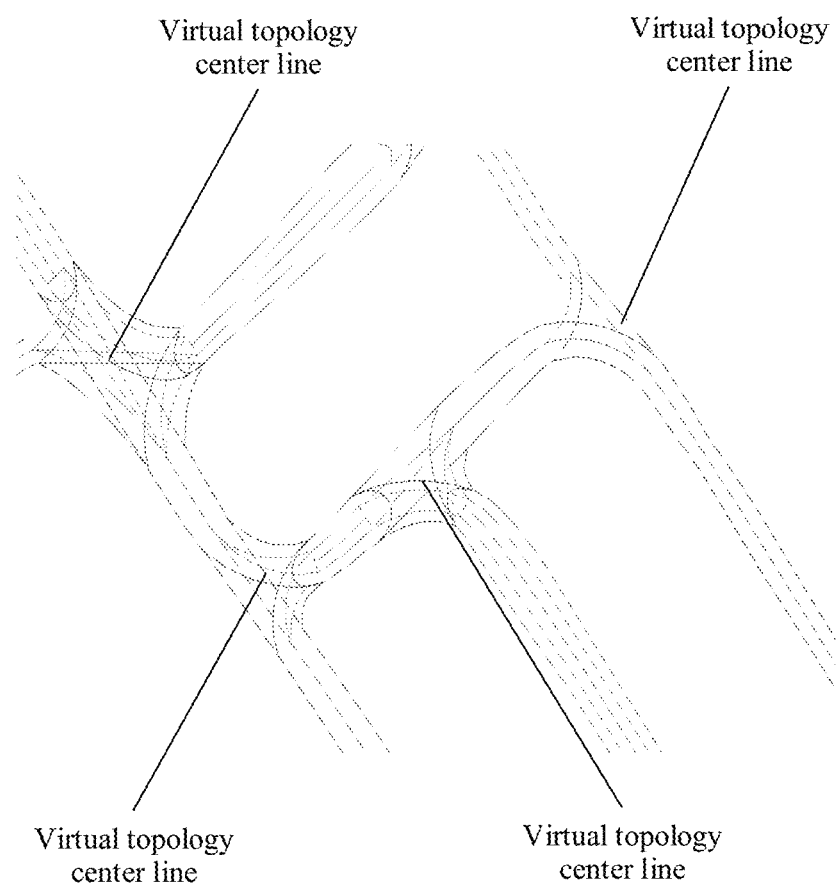
FIG. 1Q is a schematic diagram of generating a virtual topology center line according to an embodiment of this application.

For example, FIG. 1Q is a schematic diagram of generating a virtual topology center line according to an embodiment of this application. All virtual topology center lines of each of four intersection regions are Bezier curves.

It can be learned that compared with a manner in which a constructed map cannot meet an automated valet parking scenario in which there is a complex rule and an extreme perception condition, and cannot provide a road boundary, a lane boundary, road traffic direction information, and lane traffic direction information, in this embodiment of this application, the road information, the intersection information, and the lane information of the region through which the vehicle has traveled are first obtained, then the road traffic direction information and the lane traffic direction information are separately obtained, next the intersection entry and exit point information is obtained, and finally the operation of generating the virtual topology center line is performed based on the intersection entry and exit point information to obtain the autonomous driving map of the region through which the vehicle has traveled. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

Figure 2:
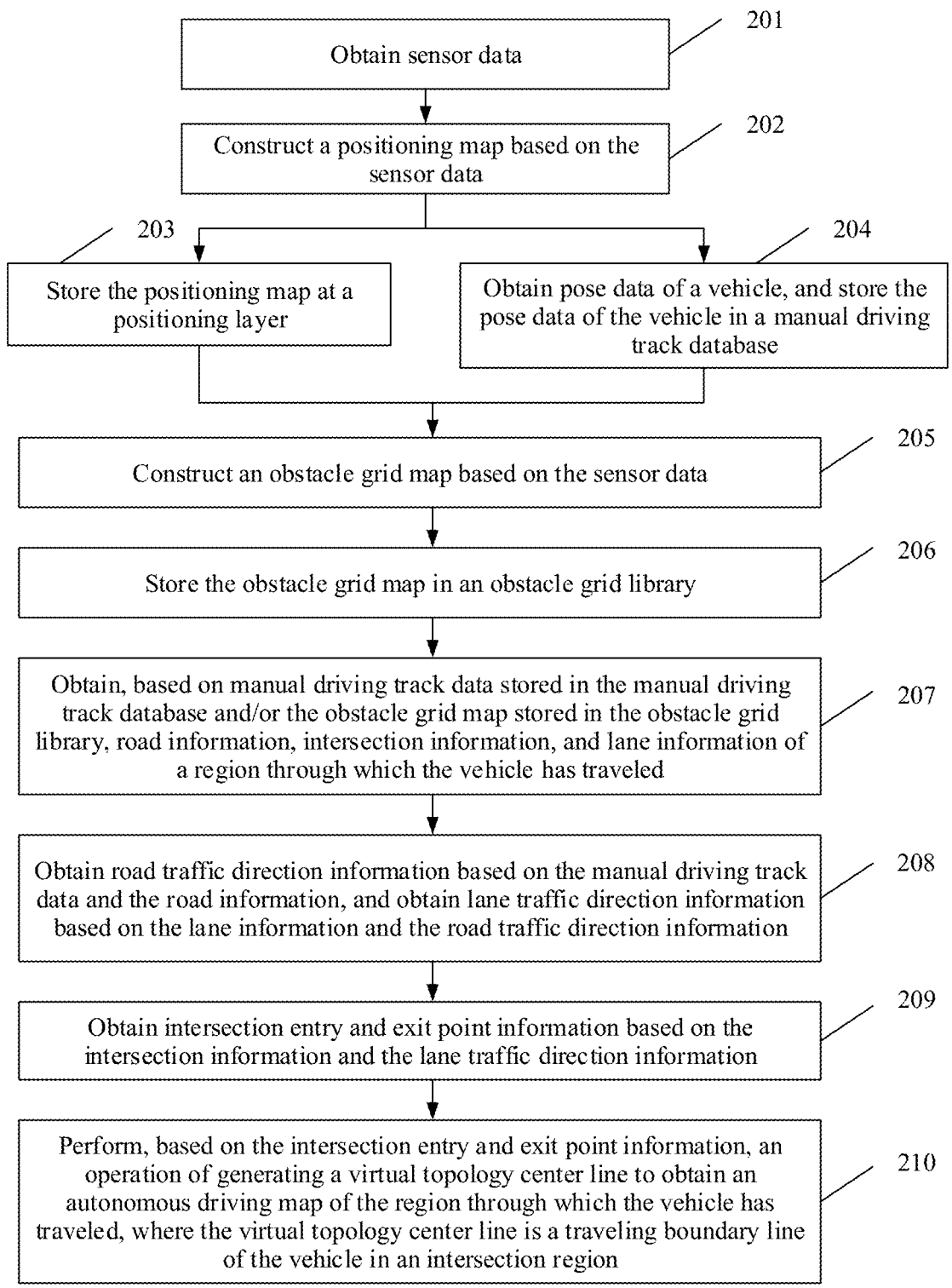
FIG. 2 is a schematic flowchart of a second autonomous driving map construction method according to an embodiment of this application.

FIG. 2 shows a second autonomous driving map construction method according to an embodiment of this application. The autonomous driving map construction method includes steps 201 to 210. Details are as follows:

201: An autonomous driving map construction apparatus obtains sensor data.

In some embodiments, that an autonomous driving map construction apparatus obtains sensor data includes the following steps:

The autonomous driving map construction apparatus respectively obtains camera data, laser radar data, millimeter-wave radar data, integrated inertial navigation system and positioning system data, and wheel speed data by using a camera, a laser radar, a millimeter-wave radar, an integrated inertial navigation system and positioning system, and a wheel speed sensor. The autonomous driving map construction apparatus determines the camera data, the laser radar data, the millimeter-wave radar data, the integrated inertial navigation system and positioning system data, and the wheel speed data as the sensor data. The camera, the laser radar, the millimeter-wave radar, the integrated inertial navigation system and positioning system, and the wheel speed sensor are all integrated in a vehicle.

202: The autonomous driving map construction apparatus constructs a positioning map based on the sensor data.

203: The autonomous driving map construction apparatus stores the positioning map at a positioning layer.

204: In a process of storing the positioning map to the positioning layer, the autonomous driving map construction apparatus obtains pose data of the vehicle, and stores the pose data of the vehicle in a manual driving track database.

In some embodiments, that the autonomous driving map construction apparatus obtains pose data of the vehicle includes the following step:

The autonomous driving map construction apparatus obtains the pose data of the vehicle by using vehicle-mounted sensors. The vehicle-mounted sensors include the camera, the laser radar, the millimeter-wave radar, the integrated inertial navigation system and positioning system, and the wheel speed sensor. The pose data of the vehicle includes an x-axis coordinate, a y-axis coordinate, a z-axis coordinate, a yaw angle, a pitch angle, and a roll angle of the vehicle at several moments in a map coordinate system.

205: The autonomous driving map construction apparatus constructs an obstacle grid map based on the sensor data.

206: The autonomous driving map construction apparatus stores the obstacle grip map in an obstacle grid library.

Step 205 and step 206 are optional.

207: The autonomous driving map construction apparatus obtains, based on manual driving track data stored in the manual driving track database and/or the obstacle grid map stored in the obstacle grid library, road information, intersection information, and lane information of a region through which the vehicle has traveled.

For step 207, refer to descriptions of step 101. Details are not described herein again.

208: The autonomous driving map construction apparatus obtains road traffic direction information based on the manual driving track data and the road information, and obtains lane traffic direction information based on the lane information and the road traffic direction information.

For step 208, refer to descriptions of step 102. Details are not described herein again.

209: The autonomous driving map construction apparatus obtains intersection entry and exit point information based on the intersection information and the lane traffic direction information.

For step 209, refer to descriptions of step 103. Details are not described herein again.

210: The autonomous driving map construction apparatus performs, based on the intersection entry and exit point information, an operation of generating a virtual topology center line to obtain an autonomous driving map of the region through which the vehicle has traveled, where the virtual topology center line is a traveling boundary line of the vehicle in an intersection region.

For step 210, refer to descriptions of step 104. Details are not described herein again.

It can be learned that compared with a manner in which a constructed map cannot meet an automated valet parking scenario in which there is a complex rule and an extreme perception condition, and cannot provide a road boundary, a lane boundary, road traffic direction information, and lane traffic direction information, in this embodiment of this application, a user drives the vehicle for the first time to enter a parking lot, and the autonomous driving map construction apparatus constructs the autonomous driving map. Because the constructed autonomous driving map can meet an automated valet parking scenario in which there is a complex rule and an extreme perception condition, and can provide the road boundary, the lane boundary, the road traffic direction information, and the lane traffic direction information, accuracy of the constructed autonomous driving map can be improved, so that an autonomous vehicle can better perform autonomous driving by using the autonomous driving map.

Figure 3:
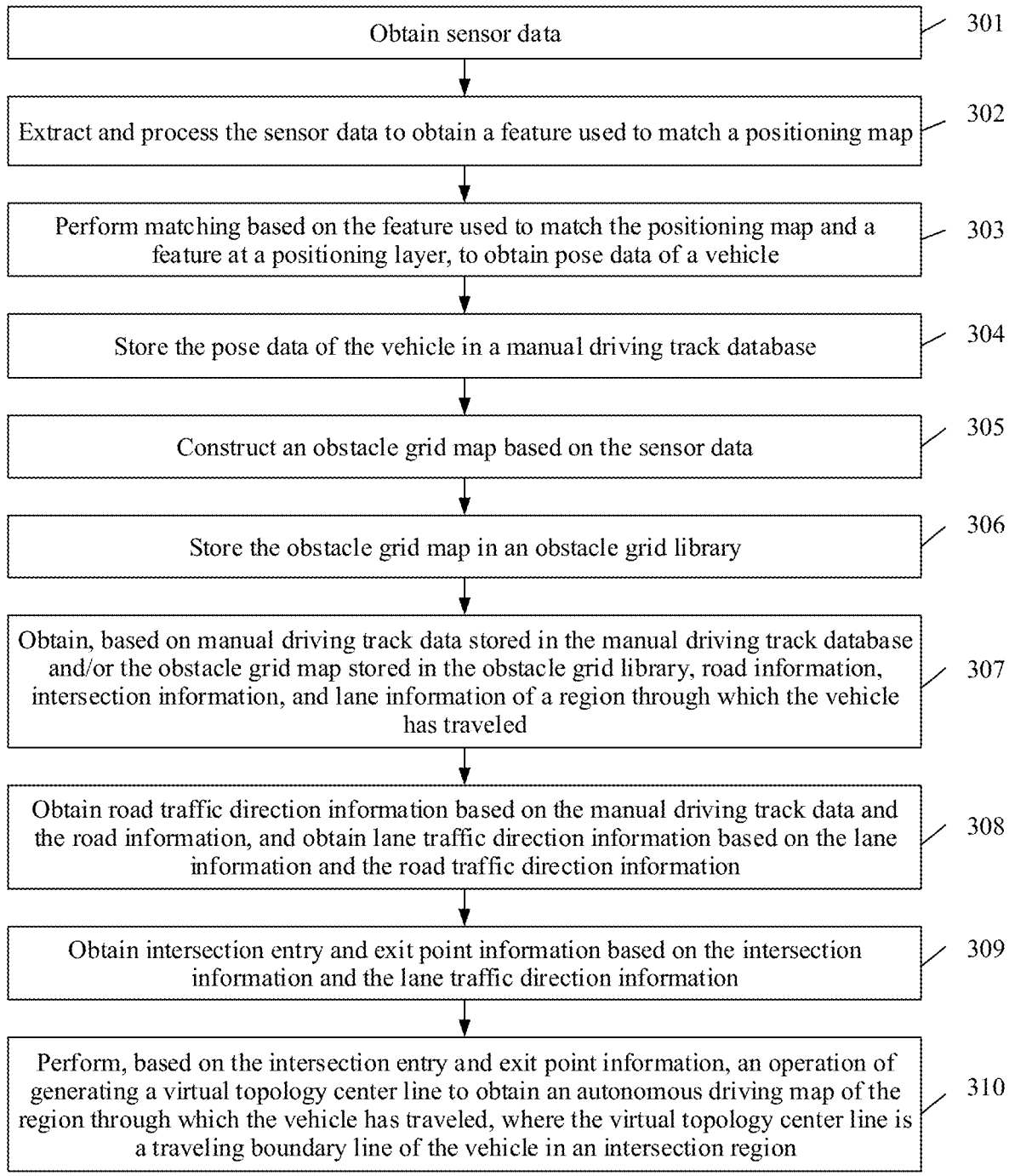
FIG. 3 is a schematic flowchart of a third autonomous driving map construction method according to an embodiment of this application.

FIG. 3 shows a third autonomous driving map construction method according to an embodiment of this application. The autonomous driving map construction method includes steps 301 to 310. Details are as follows:

301: An autonomous driving map construction apparatus obtains sensor data.

For step 301, refer to descriptions of step 201. Details are not described herein again.

302: The autonomous driving map construction apparatus extracts and processes the sensor data to obtain a feature used to match a positioning map.

303: The autonomous driving map construction apparatus performs matching based on the feature used to match the positioning map and a feature at a positioning layer, to obtain pose data of a vehicle.

304: The autonomous driving map construction apparatus stores the pose data of the vehicle in a manual driving track database.

305: The autonomous driving map construction apparatus constructs an obstacle grid map based on the sensor data.

306: The autonomous driving map construction apparatus stores the obstacle grid map in an obstacle grid library.

Step 305 and step 306 are optional.

307: The autonomous driving map construction apparatus obtains, based on manual driving track data stored in the manual driving track database and/or the obstacle grid map stored in the obstacle grid library, road information, intersection information, and lane information of a region through which the vehicle has traveled.

For step 307, refer to descriptions of step 101. Details are not described herein again.

308: The autonomous driving map construction apparatus obtains road traffic direction information based on the manual driving track data and the road information, and obtains lane traffic direction information based on the lane information and the road traffic direction information.

For step 308, refer to descriptions of step 102. Details are not described herein again.

309: The autonomous driving map construction apparatus obtains intersection entry and exit point information based on the intersection information and the lane traffic direction information.

For step 309, refer to descriptions of step 103. Details are not described herein again.

310: The autonomous driving map construction apparatus performs, based on the intersection entry and exit point information, an operation of generating a virtual topology center line to obtain an autonomous driving map of the region through which the vehicle has traveled, where the virtual topology center line is a traveling boundary line of the vehicle in an intersection region.

For step 310, refer to descriptions of step 104. Details are not described herein again.

It can be learned that compared with a manner in which a constructed map cannot meet an automated valet parking scenario in which there is a complex rule and an extreme perception condition, and cannot provide a road boundary, a lane boundary, road traffic direction information, and lane traffic direction information, in this embodiment of this application, a user drives the vehicle again to enter a parking lot, and the autonomous driving map construction apparatus updates the constructed autonomous driving map. Because the constructed autonomous driving map can meet an automated valet parking scenario in which there is a complex rule and an extreme perception condition, and can provide the road boundary, the lane boundary, the road traffic direction information, and the lane traffic direction information, accuracy and richness of the constructed autonomous driving map can be improved, so that an autonomous vehicle can better perform autonomous driving by using the autonomous driving map.

Figure 4:
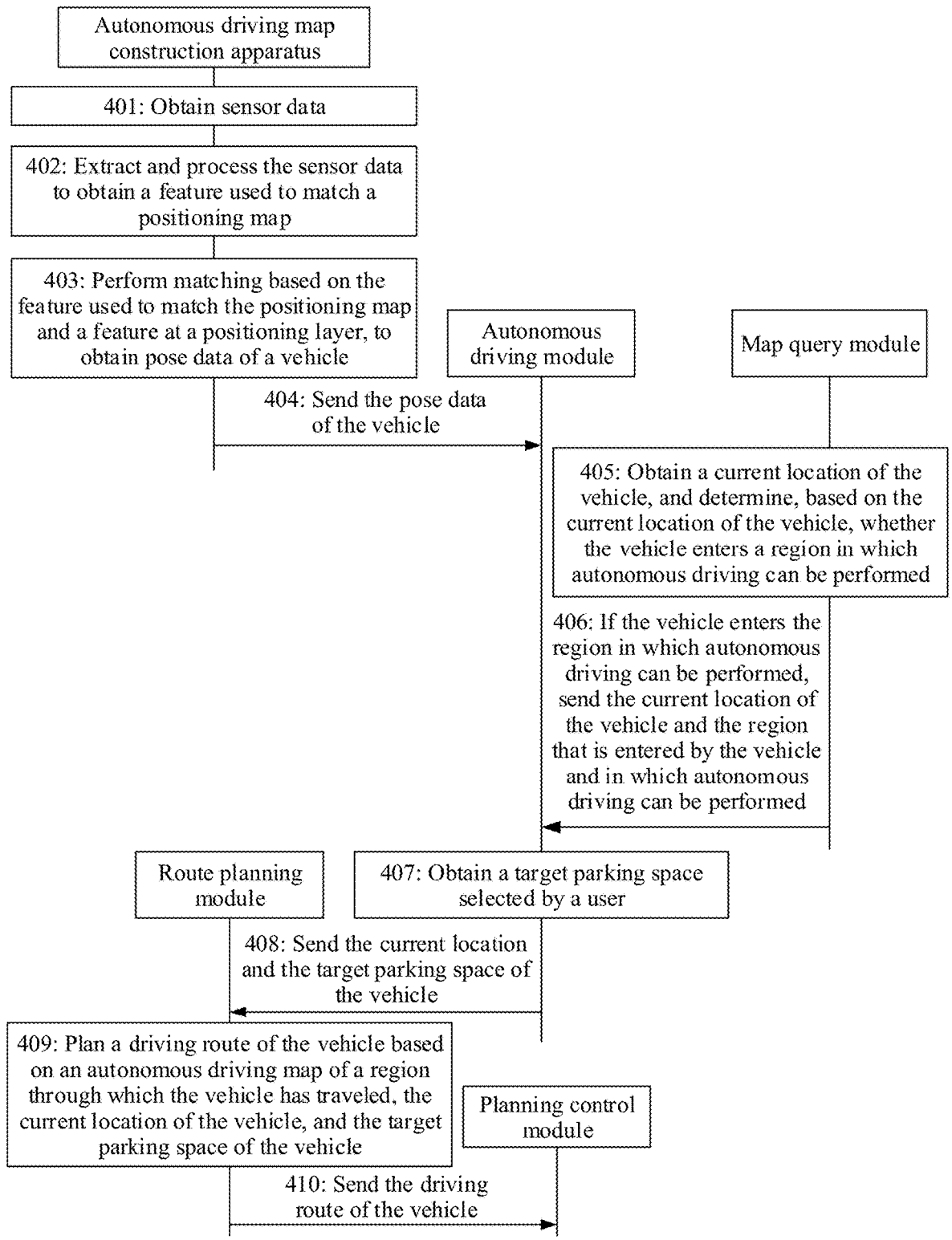
FIG. 4 is a schematic flowchart of a method for implementing automated valet parking based on an autonomous driving map according to an embodiment of this application.

FIG. 4 is a schematic flowchart of a method for implementing automated valet parking based on an autonomous driving map according to an embodiment of this application. The method for implementing automated valet parking based on an autonomous driving map includes steps 401 to 410. Details are as follows:

401: An autonomous driving map construction apparatus obtains sensor data.

402: The autonomous driving map construction apparatus extracts and processes the sensor data to obtain a feature used to match a positioning map.

403: The autonomous driving map construction apparatus performs matching based on the feature used to match the positioning map and a feature at a positioning layer, to obtain pose data of a vehicle.

404: The autonomous driving map construction apparatus sends the pose data of the vehicle to an autonomous driving module.

405: A map query module obtains a current location of the vehicle, and determines, based on the current location of the vehicle, whether the vehicle enters a region in which autonomous driving can be performed.

406: If the vehicle enters the region in which autonomous driving can be performed, the map query module sends, to the autonomous driving module, the current location of the vehicle and the region that is entered by the vehicle and in which autonomous driving can be performed.

407: The autonomous driving module receives the current location of the vehicle and the region that is entered by the vehicle and in which autonomous driving can be performed that are sent by the map query module, and obtains a target parking space selected by a user.

408: The autonomous driving module sends the current location and the target parking space of the vehicle to a route planning module.

409: The route planning module receives the current location and the target parking space of the vehicle that are sent by the autonomous driving module, and plans a driving route of the vehicle based on an autonomous driving map of a region through which the vehicle has traveled, the current location of the vehicle, and the target parking space of the vehicle.

410: The route planning module sends the driving route of the vehicle to a planning control module, so that the planning control module completes searching for the target parking space, obstacle avoidance, and parking.

It can be learned that compared with a manner in which a constructed map cannot meet an automated valet parking scenario in which there is a complex rule and an extreme perception condition, and cannot provide a road boundary, a lane boundary, road traffic direction information, and lane traffic direction information, in this embodiment of this application, because the constructed autonomous driving map can meet an automated valet parking scenario in which there is a complex rule and an extreme perception condition, and can provide the road boundary, the lane boundary, the road traffic direction information, and the lane traffic direction information, the user drives the vehicle to enter a region in which the autonomous driving map has been constructed, and can go to the target parking space through autonomous driving and complete parking.

Figure 5:
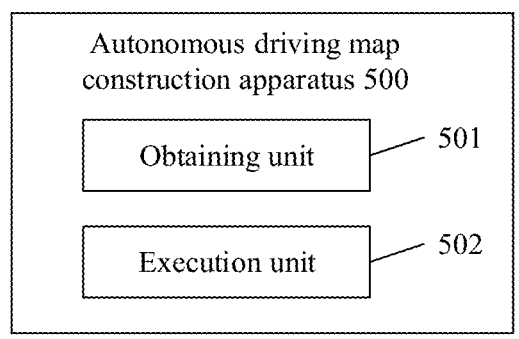
FIG. 5 is a block diagram of composition of functional units of an autonomous driving map construction apparatus according to an embodiment of this application.

FIG. 5 is a block diagram of composition of functional units of an autonomous driving map construction apparatus according to an embodiment of this application. The autonomous driving map construction apparatus 500 includes:

an obtaining unit 501, configured to obtain, based on manual driving track data and/or an obstacle grid map, road information, intersection information, and lane information of a region through which a vehicle has traveled, where the obtaining unit 501 is further configured to obtain road traffic direction information based on the manual driving track data and the road information;

the obtaining unit 501 is further configured to obtain lane traffic direction information based on the lane information and the road traffic direction information; and the obtaining unit 501 is further configured to obtain intersection entry and exit point information based on the intersection information and the lane traffic direction information; and an execution unit 502, configured to perform, based on the intersection entry and exit point information, an operation of generating a virtual topology center line to obtain an autonomous driving map of the region through which the vehicle has traveled, where the virtual topology center line is a traveling boundary line of the vehicle in an intersection region.

In some possible implementations, in the aspect of obtaining, based on manual driving track data and/or an obstacle grid map, road information, intersection information, and lane information of a region through which a vehicle has traveled, the obtaining unit 501 is configured to:

obtain, based on the manual driving track data and/or the obstacle grid map, a road boundary of the region through which the vehicle has traveled;

obtain, based on the road boundary, a road center line of the region through which the vehicle has traveled;

obtain, based on the road boundary and the road center line, an intersection region of the region through which the vehicle has traveled;

obtain, based on the road boundary, the road center line, and the intersection region, a lane boundary of the region through which the vehicle has traveled; and obtain, based on the lane boundary, a lane center line of the region through which the vehicle has traveled.

In some possible implementations, in the aspect of obtaining, based on the manual driving track data and/or the obstacle grid map, a road boundary of the region through which the vehicle has traveled, the obtaining unit 501 is configured to:

obtain a plurality of track point buffer regions based on the manual driving track data and/or the obstacle grid map;

perform a fusion operation on the plurality of track point buffer regions to obtain a road buffer region; and determine a boundary of the road buffer region as the road boundary of the region through which the vehicle has traveled.

In some possible implementations, in the aspect of obtaining, based on the road boundary, a road center line of the region through which the vehicle has traveled, the obtaining unit 501 is configured to:

perform an equi-spaced point forming operation on the road boundary to obtain a road boundary obtained after the equi-spaced point forming;

obtain a first Thiessen polygon side set based on the road boundary obtained after the equi-spaced point forming;

perform, on the first Thiessen polygon side set, an operation of deleting a Thiessen polygon side outside the road boundary obtained after the equi-spaced point forming, to obtain a second Thiessen polygon side set;

obtain a buffer region of the road boundary based on the road boundary and a pre-stored first width;

obtain a third Thiessen polygon side set based on a Thiessen polygon side that is in the second Thiessen polygon side set and that does not intersect the buffer region of the road boundary;

perform a dangling line deletion operation on the third Thiessen polygon side set to obtain a fourth Thiessen polygon side set; and perform a connecting operation on the fourth Thiessen polygon side set, to obtain the road center line of the region through which the vehicle has traveled.

In some possible implementations, in the aspect of obtaining, based on the road boundary and the road center line, an intersection region of the region through which the vehicle has traveled, the obtaining unit 501 is configured to:
  obtain a center point of each intersection based on the road center line; determine a circle whose circle center is the center point of each intersection and whose radius is a pre-stored first length as a center point buffer region of each intersection;
  perform, on sub-road center lines, an operation of deleting a sub-road center line whose length is less than a pre-stored second length, to obtain each road section center line, where each sub-road center line is a remaining road center line outside the center point buffer region of each intersection in the road center line;
  obtain each road section center line buffer region based on each road section center line and a pre-stored second width; and
  perform, on sub-intersection regions, an operation of deleting a sub-intersection region whose area is less than a pre-stored first area, to obtain the intersection region of the region through which the vehicle has traveled, where each sub-intersection region is a remaining intersection region outside each road section center line buffer region in a plane including the road boundary.

In some possible implementations, in the aspect of obtaining, based on the road boundary, the road center line, and the intersection region, a lane boundary of the region through which the vehicle has traveled, the obtaining unit 501 is configured to:
  obtain road section boundaries outside the intersection region in the road boundary;
  obtain road section center lines outside the intersection region in the road center line;
  determine, based on the road section boundaries and the road section center lines, whether each of road sections is a single-lane section or a dual-lane section, where the road sections are in a one-to-one correspondence with the road section boundaries and the road section center lines;
  if a road section A is the single-lane section, determine a road section boundary corresponding to the road section A as a lane boundary of a single-lane section through which the vehicle has traveled, where the road section A is any one of all single-lane sections included in the road sections; and
  if a road section B is the dual-lane section, determine a road section boundary and a road section center line that correspond to the road section B as lane boundaries of a dual-lane section through which the vehicle has traveled, where the road section B is any one of all dual-lane sections included in the road sections.

In some possible embodiments, in the aspect of obtaining road traffic direction information based on the manual driving track data and the road information, the obtaining unit 501 is configured to:
  obtain a manual driving track and first relative angle difference sets of road sections based on the manual driving track data and the road center line, where the first relative angle difference sets are in a one-to-one correspondence with the road sections;
  if a variance of a first relative angle difference set C is less than a pre-stored first angle, determine that a road section corresponding to the first relative angle difference set C is a one-way section, where the first relative angle difference set C is any one of all first relative angle difference sets that are included in the first relative angle difference sets and whose variances are less than the first angle; and
  if an average value of the first relative angle difference set C is less than a pre-stored second angle, determine that a road traffic direction of the road section corresponding to the first relative angle difference set C is a forward traffic direction; or
  if the average value of the first relative angle difference set C is greater than or equal to the second angle, determine that the road traffic direction of the road section corresponding to the first relative angle difference set C is a reverse traffic direction.

In some possible embodiments, in the aspect of obtaining road traffic direction information based on the manual driving track data and the road information, the obtaining unit 501 is configured to:
  if a variance of a first relative angle difference set D is greater than or equal to the first angle, determine that a road section corresponding to the first relative angle difference D is a two-way section, where the first relative angle difference set D is any one of all first relative angle difference sets that are included in the first relative angle difference sets and whose variances are greater than or equal to the first angle.

In some possible embodiments, in the aspect of obtaining lane traffic direction information based on the lane information and the road traffic direction information, the obtaining unit 501 is configured to:
  if a road section E obtained based on the lane information and the road traffic direction information is a two-way dual-lane section, obtain two second relative angle difference sets of two lane center lines of the road section E based on a road section center line corresponding to the road section E, where the road section E is any one of all two-way dual-lane sections included in the road sections;
  if an average value of a second relative angle difference set F is less than a pre-stored third angle, determine whether a lane center line corresponding to the second relative angle difference set F intersects a right buffer region of the road section center line corresponding to the road section E, where the second relative angle difference set F is either of the two second relative angle difference sets; and if the lane center line corresponding to the second relative angle difference set F intersects the right buffer region of the road section center line corresponding to the road section E, determine that a lane traffic direction of a lane on which the lane center line corresponding to the second relative angle difference set F is located is a forward traffic direction, or if the lane center line corresponding to the second relative angle difference set F does not intersect the right buffer region of the road section center line corresponding to the road section E, determine that the lane traffic direction of the lane on which the lane center line corresponding to the second relative angle difference set F is located is a reverse traffic direction; and
  if an average value of a second relative angle difference set G is greater than or equal to the third angle, determine whether a lane center line corresponding to the second relative angle difference set G intersects a left buffer region of the road section center line corresponding to the road section E, where the second relative angle difference set G is either of the two second relative angle difference sets; and if the lane center line corresponding to the second relative angle difference set G intersects the left buffer region of the road section center line corresponding to the road section E, determine that a lane traffic direction of a lane on which the lane center line corresponding to the second relative angle difference set G is located is a forward traffic direction, or if the lane center line corresponding to the second relative angle difference set G does not intersect the left buffer region of the road section center line corresponding to the road section E, determine that the lane traffic direction of the lane on which the lane center line corresponding to the second relative angle difference set G is located is a reverse traffic direction.

In some possible embodiments, in the aspect of obtaining lane traffic direction information based on the lane information and the road traffic direction information, the obtaining unit 501 is configured to:
  if a road section H obtained based on the lane information and the road traffic direction information is a two-way single-lane section, determine that a lane traffic direction of the road section H is two-way, where the road section H is any one of all two-way single-lane sections included in the road sections; and
  if a road section I obtained based on the lane information and the road traffic direction information is a one-way single-lane section, determine a road traffic direction of the road section I as a lane traffic direction of the road section I, where the road section I is any one of all one-way single-lane sections included in the road sections.

In some possible embodiments, in the aspect of obtaining intersection entry and exit point information based on the intersection information and the lane traffic direction information, the obtaining unit 501 is configured to:
  obtain a start formed point and an end formed point of a lane center line J, where the lane center line J is any one of all lane center lines included in the road sections;
  obtain a buffer region of each intersection region based on each intersection region and a pre-stored third width;
  if a formed point K intersects a buffer region of an intersection region L, determine that the formed point L belongs to the intersection region L, where the formed point K is either of the start formed point and the end formed point of the lane center line J, and the intersection region L is any one of the intersection regions; and
  if a lane traffic direction of a lane on which the lane center line J is located is a forward traffic direction, determine the start formed point of the lane center line J as an end formed point of the virtual topology center line, and determine the end formed point of the lane center line J as a start formed point of the virtual topology center line; or
  if the lane traffic direction of the lane on which the lane center line J is located is a reverse traffic direction, determine the start formed point of the lane center line J as the start formed point of the virtual topology center line, and determine the end formed point of the lane center line J as the end formed point of the virtual topology center line; or if the lane traffic direction of the lane on which the lane center line J is located is two-way, determine the start formed point of the lane center line J as the start formed point of the virtual topology center line, and determine the end formed point of the lane center line J as the end formed point of the virtual topology center line; or determine the start formed point of the lane center line J as the end formed point of the virtual topology center line, and determine the end formed point of the lane center line J as the start formed point of the virtual topology center line.

Figure 6:
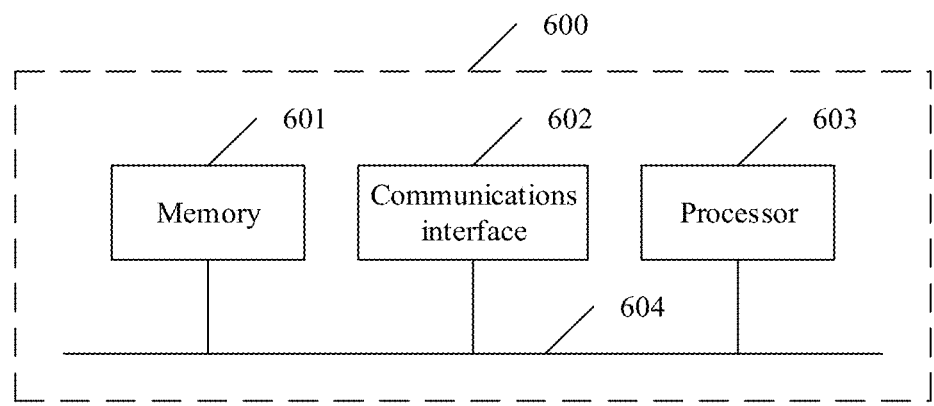
FIG. 6 is a schematic diagram of a structure of an autonomous driving map construction apparatus according to an embodiment of this application.

FIG. 6 is a schematic diagram of a structure of an autonomous driving map construction apparatus according to an embodiment of this application. The autonomous driving map construction apparatus 600 includes a memory 601, a communications interface 602, and a processor 603 that are coupled to each other. For example, the memory 601, the communications interface 602, and the processor 603 are coupled through a bus 604.

The memory 601 may include but is not limited to a random access memory (RAM), an erasable programmable read-only memory (EPROM), a read-only memory (ROM), a compact disc read-only memory (CD-ROM), and the like. The memory 601 is configured to store related instructions and data.

The processor 603 may be one or more central processing units (CPUs). When the processor 603 is one CPU, the CPU may be a single-core CPU or a multi-core CPU.

The processor 603 is configured to: read program code stored in the memory 601, and cooperate with the communications interface 602 to perform some or all of the steps of the methods performed by the autonomous driving map construction apparatus 600 in the foregoing embodiments of this application.

The processor 603 is configured to obtain, based on manual driving track data and/or an obstacle grid map, road information, intersection information, and lane information of a region through which a vehicle has traveled.

The processor 603 is further configured to: obtain road traffic direction information based on the manual driving track data and the road information, and obtain lane traffic direction information based on the lane information and the road traffic direction information.

The processor 603 is further configured to obtain intersection entry and exit point information based on the intersection information and the lane traffic direction information.

The processor 603 is further configured to perform, based on the intersection entry and exit point information, an operation of generating a virtual topology center line to obtain an autonomous driving map of the region through which the vehicle has traveled, where the virtual topology center line is a traveling boundary line of the vehicle in an intersection region.

In some possible embodiments, in the aspect of obtaining, based on manual driving track data and/or an obstacle grid map, road information, intersection information, and lane information of a region through which a vehicle has traveled, the processor 603 is configured to:
  obtain, based on the manual driving track data and/or the obstacle grid map, a road boundary of the region through which the vehicle has traveled;
  obtain, based on the road boundary, a road center line of the region through which the vehicle has traveled;
  obtain, based on the road boundary and the road center line, an intersection region of the region through which the vehicle has traveled;
  obtain, based on the road boundary, the road center line, and the intersection region, a lane boundary of the region through which the vehicle has traveled; and
  obtain, based on the lane boundary, a lane center line of the region through which the vehicle has traveled.

In some possible embodiments, in the aspect of obtaining, based on the manual driving track data and/or the obstacle grid map, a road boundary of the region through which the vehicle has traveled, the processor 603 is configured to:
- obtain a plurality of track point buffer regions based on the manual driving track data and/or the obstacle grid map;
- perform a fusion operation on the plurality of track point buffer regions to obtain a road buffer region; and
- determine a boundary of the road buffer region as the road boundary of the region through which the vehicle has traveled.

In some possible embodiments, in the aspect of obtaining, based on the road boundary, a road center line of the region through which the vehicle has traveled, the processor 603 is configured to:
- perform an equi-spaced point forming operation on the road boundary to obtain a road boundary obtained after the equi-spaced point forming;
- obtain a first Thiessen polygon side set based on the road boundary obtained after the equi-spaced point forming;
- perform, on the first Thiessen polygon side set, an operation of deleting a Thiessen polygon side outside the road boundary obtained after the equi-spaced point forming, to obtain a second Thiessen polygon side set;
- obtain a buffer region of the road boundary based on the road boundary and a pre-stored first width;
- obtain a third Thiessen polygon side set based on a Thiessen polygon side that is in the second Thiessen polygon side set and that does not intersect the buffer region of the road boundary;
- perform a dangling line deletion operation on the third Thiessen polygon side set to obtain a fourth Thiessen polygon side set; and
- perform a connecting operation on the fourth Thiessen polygon side set, to obtain the road center line of the region through which the vehicle has traveled.

In some possible embodiments, in the aspect of obtaining, based on the road boundary and the road center line, an intersection region of the region through which the vehicle has traveled, the processor 603 is configured to:
- obtain a center point of each intersection based on the road center line;
- determine a circle whose circle center is the center point of each intersection and whose radius is a pre-stored first length as a center point buffer region of each intersection;
- perform, on sub-road center lines, an operation of deleting a sub-road center line whose length is less than a pre-stored second length, to obtain each road section center line, where each sub-road center line is a remaining road center line outside the center point buffer region of each intersection in the road center line;
- obtain each road section center line buffer region based on each road section center line and a pre-stored second width; and
- perform, on sub-intersection regions, an operation of deleting a sub-intersection region whose area is less than a pre-stored first area, to obtain the intersection region of the region through which the vehicle has traveled, where each sub-intersection region is a remaining intersection region outside each road section center line buffer region in a plane including the road boundary.

In some possible embodiments, in the aspect of obtaining, based on the road boundary, the road center line, and the intersection region, a lane boundary of the region through which the vehicle has traveled, the processor 603 is configured to:
- obtain road section boundaries outside the intersection region in the road boundary;
- obtain road section center lines outside the intersection region in the road center line;
- determine, based on the road section boundaries and the road section center lines, whether each of road sections is a single-lane section or a dual-lane section, where the road sections are in a one-to-one correspondence with the road section boundaries and the road section center lines;
- if a road section A is the single-lane section, determine a road section boundary corresponding to the road section A as a lane boundary of a single-lane section through which the vehicle has traveled, where the road section A is any one of all single-lane sections included in the road sections; and
- if a road section B is the dual-lane section, determine a road section boundary and a road section center line that correspond to the road section B as lane boundaries of a dual-lane section through which the vehicle has traveled, where the road section B is any one of all dual-lane sections included in the road sections.

In some possible embodiments, in the aspect of obtaining road traffic direction information based on the manual driving track data and the road information, the processor 603 is configured to:
- obtain a manual driving track and first relative angle difference sets of road sections based on the manual driving track data and the road center line, where the first relative angle difference sets are in a one-to-one correspondence with the road sections;
- if a variance of a first relative angle difference set C is less than a pre-stored first angle, determine that a road section corresponding to the first relative angle difference set C is a one-way section, where the first relative angle difference set C is any one of all first relative angle difference sets that are included in the first relative angle difference sets and whose variances are less than the first angle; and
- if an average value of the first relative angle difference set C is less than a pre-stored second angle, determine that a road traffic direction of the road section corresponding to the first relative angle difference set C is a forward traffic direction; or
- if the average value of the first relative angle difference set C is greater than or equal to the second angle, determine that the road traffic direction of the road section corresponding to the first relative angle difference set C is a reverse traffic direction.

In some possible embodiments, in the aspect of obtaining road traffic direction information based on the manual driving track data and the road information, the processor 603 is configured to:
- if a variance of a first relative angle difference set D is greater than or equal to the first angle, determine that a road section corresponding to the first relative angle difference D is a two-way section, where the first relative angle difference set D is any one of all first relative angle difference sets that are included in the first relative angle difference sets and whose variances are greater than or equal to the first angle.

In some possible embodiments, in the aspect of obtaining lane traffic direction information based on the lane information and the road traffic direction information, the processor 603 is configured to:

if a road section E obtained based on the lane information and the road traffic direction information is a two-way dual-lane section, obtain two second relative angle difference sets of two lane center lines of the road section E based on a road section center line corresponding to the road section E, where the road section E is any one of all two-way dual-lane sections included in the road sections;

if an average value of a second relative angle difference set F is less than a pre-stored third angle, determine whether a lane center line corresponding to the second relative angle difference set F intersects a right buffer region of the road section center line corresponding to the road section E, where the second relative angle difference set F is either of the two second relative angle difference sets; and if the lane center line corresponding to the second relative angle difference set F intersects the right buffer region of the road section center line corresponding to the road section E, determine that a lane traffic direction of a lane on which the lane center line corresponding to the second relative angle difference set F is located is a forward traffic direction, or if the lane center line corresponding to the second relative angle difference set F does not intersect the right buffer region of the road section center line corresponding to the road section E, determine that the lane traffic direction of the lane on which the lane center line corresponding to the second relative angle difference set F is located is a reverse traffic direction; and if an average value of a second relative angle difference set G is greater than or equal to the third angle, determine whether a lane center line corresponding to the second relative angle difference set G intersects a left buffer region of the road section center line corresponding to the road section E, where the second relative angle difference set G is either of the two second relative angle difference sets; and if the lane center line corresponding to the second relative angle difference set G intersects the left buffer region of the road section center line corresponding to the road section E, determine that a lane traffic direction of a lane on which the lane center line corresponding to the second relative angle difference set G is located is a forward traffic direction, or if the lane center line corresponding to the second relative angle difference set G does not intersect the left buffer region of the road section center line corresponding to the road section E, determine that the lane traffic direction of the lane on which the lane center line corresponding to the second relative angle difference set G is located is a reverse traffic direction.

In some possible embodiments, in the aspect of obtaining lane traffic direction information based on the lane information and the road traffic direction information, the processor 603 is configured to:

if a road section H obtained based on the lane information and the road traffic direction information is a two-way single-lane section, determine that a lane traffic direction of the road section H is two-way, where the road section H is any one of all two-way single-lane sections included in the road sections; and if a road section I obtained based on the lane information and the road traffic direction information is a one-way single-lane section, determine a road traffic direction of the road section I as a lane traffic direction of the road section I, where the road section I is any one of all one-way single-lane sections included in the road sections.

In some possible embodiments, in the aspect of obtaining intersection entry and exit point information based on the intersection information and the lane traffic direction information, the processor 603 is configured to:

obtain a start formed point and an end formed point of a lane center line J, where the lane center line J is any one of all lane center lines included in the road sections;

obtain a buffer region of each intersection region based on each intersection region and a pre-stored third width;

if a formed point K intersects a buffer region of an intersection region L, determine that the formed point L belongs to the intersection region L, where the formed point K is either of the start formed point and the end formed point of the lane center line J, and the intersection region L is any one of the intersection regions; and if a lane traffic direction of a lane on which the lane center line J is located is a forward traffic direction, determine the start formed point of the lane center line J as an end formed point of the virtual topology center line, and determine the end formed point of the lane center line J as a start formed point of the virtual topology center line; or if the lane traffic direction of the lane on which the lane center line J is located is a reverse traffic direction, determine the start formed point of the lane center line J as the start formed point of the virtual topology center line, and determine the end formed point of the lane center line J as the end formed point of the virtual topology center line; or if the lane traffic direction of the lane on which the lane center line J is located is two-way, determine the start formed point of the lane center line J as the start formed point of the virtual topology center line, and determine the end formed point of the lane center line J as the end formed point of the virtual topology center line; or determine the start formed point of the lane center line J as the end formed point of the virtual topology center line, and determine the end formed point of the lane center line J as the start formed point of the virtual topology center line.

An embodiment of this application further provides a computer-readable storage medium. The computer-readable storage medium stores computer instructions, and the computer program is executed by hardware (for example, a processor) to implement some or all of the steps of any method performed by the autonomous driving map construction apparatus in embodiments of this application.

An embodiment of this application further provides a computer program product. When the computer program product runs on a computer or a processor, the computer or the processor is enabled to perform some or all of the steps of the autonomous driving map construction method in the foregoing aspects.

Figure 7:
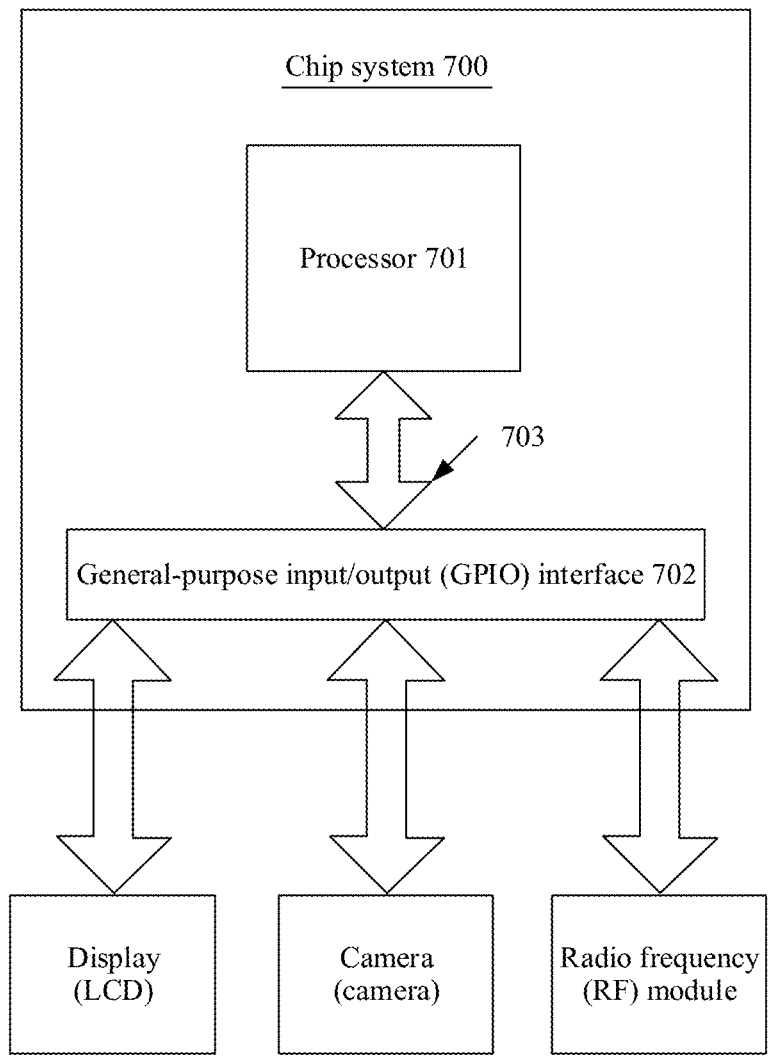
FIG. 7 is a schematic diagram of a structure of a chip system according to an embodiment of this application.

FIG. 7 is a schematic diagram of a structure of a chip system according to an embodiment of this application. The chip system 700 may include a processor 701 and one or more interfaces 702 coupled to the processor 701. An example is as follows:

The processor 701 may be configured to: read and execute computer-readable instructions. In an exemplary implementation, the processor 701 may mainly include a controller, an arithmetic unit, and a register. For example, the controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for storing a quantity of register operations, intermediate operation results, and the like that are temporarily stored during instruction execution. In an exemplary implementation, a hardware architecture of the processor 701 may be an application-specific integrated circuit (ASIC) architecture, a microprocessor without interlocked piped stages (MIPS) architecture, an advanced reduced instruction set computing machines (ARM) architecture, an NP architecture, or the like. The processor 701 may be a single-core or multi-core processor.

For example, the interface 702 may be configured to input to-be-processed data to the processor 701, and may output a processing result of the processor 701. In an exemplary implementation, the interface 702 may be a general-purpose input/output (GPIO) interface, and may be connected to a plurality of peripheral devices (for example, a liquid crystal display (LCD)), a camera, and a radio frequency (RF) module. The interface 702 is connected to the processor 701 through a bus 703.

In some possible embodiments, the processor 701 may be configured to invoke, from a memory, an implementation program or data that is of an autonomous driving map construction method provided in one or more embodiments of this application and that is on a network device side or a terminal device side, so that the chip can implement the autonomous driving map construction methods shown in FIG. 1A, FIG. 2, and FIG. 3, and the method for implementing automated valet parking based on an autonomous driving map shown in FIG. 4. The memory may be integrated into the processor 701, or may be coupled to the chip system 700 through the interface 702. In other words, the memory may be a part of the chip system 700, or may be independent of the chip system 700. The interface 702 may be configured to output an execution result of the processor 701. In this application, the interface 702 may be configured to output a decoding result of the processor 701. For the autonomous driving map construction method provided in one or more embodiments of this application, refer to the foregoing embodiments. Details are not described herein again.

In the foregoing embodiments, all or some of the functions may be implemented by using software, hardware, or a combination of software and hardware. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures of the methods in the foregoing embodiments may be performed. The foregoing storage medium includes any medium that can store program code, such as a ROM or a random access memory RAM, a magnetic disk, or an optical disc.

What is claimed is:

1. A method for constructing a map for autonomous driving that applies to an apparatus comprising a processor, comprising:

obtaining, based on manual driving track data and/or an obstacle grid map, road information, intersection information, and lane information of a region through which a vehicle has traveled;

obtaining road traffic direction information based on the manual driving track data and the road information, and obtaining lane traffic direction information based on the lane information and the road traffic direction information;

obtaining intersection entry and exit point information based on the intersection information and the lane traffic direction information; and performing, based on the intersection entry and exit point information, an operation of generating a virtual topology center line to obtain an autonomous driving map of the region through which the vehicle has traveled, wherein the virtual topology center line is a traveling boundary line of the vehicle in an intersection region, wherein obtaining, based on the manual driving track data and/or the obstacle grid map, the road information, the intersection information, and the lane information of the region through which the vehicle has traveled comprises:

obtaining, based on the manual driving track data and/or the obstacle grid map, a road boundary of the region through which the vehicle has traveled, wherein obtaining the road boundary of the region through which the vehicle has traveled comprises:

determining, based on the manual driving track data and the obstacle grid map, a drivable width of the vehicle at each time moment of a plurality of time moments, wherein the drivable width of the vehicle is determined by summing a first y-axis coordinate along a positive direction and a second y-axis coordinate along a negative direction, wherein the first and second y-axis coordinates are comprised in pose data provided by one or more sensors in the vehicle, and wherein the first and second y-axis coordinates correspond to probabilities greater than a preset probability;

obtaining a plurality of track point buffer regions based on the manual driving track data and/or the obstacle grid map, wherein each track point buffer region of the plurality of track point buffer regions is determined based on a drivable width of the vehicle of at a corresponding time moment of the plurality of time moments;

performing a fusion operation on the plurality of track point buffer regions to obtain a road buffer region; and determining a boundary of the road buffer region as the road boundary of the region through which the vehicle has traveled;

obtaining, based on the road boundary, a road center line of the region through which the vehicle has traveled;

obtaining, based on the road boundary and the road center line, an intersection region of the region through which the vehicle has traveled;

obtaining, based on the road boundary, the road center line, and the intersection region, a lane boundary of the region through which the vehicle has traveled; and obtaining, based on the lane boundary, a lane center line of the region through which the vehicle has traveled.

2. The method according to claim 1, wherein obtaining, based on the road boundary, the road center line of the region through which the vehicle has traveled comprises:

performing an equi-spaced point forming operation on the road boundary to obtain a road boundary obtained after the equi-spaced point forming;

obtaining a first Thiessen polygon side set based on the road boundary obtained after the equi-spaced point forming;

performing, on the first Thiessen polygon side set, an operation of deleting a Thiessen polygon side outside the road boundary obtained after the equi-spaced point forming, to obtain a second Thiessen polygon side set;

obtaining a buffer region of the road boundary based on the road boundary and a pre-stored first width;

obtaining a third Thiessen polygon side set based on a Thiessen polygon side that is in the second Thiessen polygon side set and that does not intersect the buffer region of the road boundary;

performing a dangling line deletion operation on the third Thiessen polygon side set to obtain a fourth Thiessen polygon side set; and performing a connecting operation on the fourth Thiessen polygon side set, to obtain the road center line of the region through which the vehicle has traveled.

3. The method according to claim 2, wherein obtaining, based on the road boundary and the road center line, the intersection region of the region through which the vehicle has traveled comprises:

obtaining a center point of each intersection based on the road center line;

determining a circle whose circle center is the center point of each intersection and whose radius is a pre-stored first length as a center point buffer region of each intersection;

performing, on sub-road center lines, an operation of deleting a sub-road center line whose length is less than a pre-stored second length, to obtain each road section center line, wherein each sub-road center line is a remaining road center line outside the center point buffer region of each intersection in the road center line;

obtaining each road section center line buffer region based on each road section center line and a pre-stored second width; and performing, on sub-intersection regions, an operation of deleting a sub-intersection region whose area is less than a pre-stored first area, to obtain the intersection region of the region through which the vehicle has traveled, wherein each sub-intersection region is a remaining intersection region outside each road section center line buffer region in a plane comprising the road boundary.

4. The method according to claim 3, wherein obtaining, based on the road boundary, the road center line, and the intersection region, the lane boundary of the region through which the vehicle has traveled comprises:

obtaining road section boundaries outside the intersection region in the road boundary;

obtaining road section center lines outside the intersection region in the road center line;

determining, based on the road section boundaries and the road section center lines, whether each of road sections is a single-lane section or a dual-lane section, wherein the road sections are in a one-to-one correspondence with the road section boundaries and the road section center lines;

in response to a road section A being the single-lane section, determining a road section boundary corresponding to the road section A as a lane boundary of a single-lane section through which the vehicle has traveled, wherein the road section A is any one of all single-lane sections that belong to the road sections; and in response to a road section B being the dual-lane section, determining a road section boundary and a road section center line that correspond to the road section B as lane boundaries of a dual-lane section through which the vehicle has traveled, wherein the road section B is any one of all dual-lane sections that belong to the road sections.

5. The method according to claim 4, wherein obtaining the road traffic direction information based on the manual driving track data and the road information comprises:

obtaining a manual driving track and first relative angle difference sets of road sections based on the manual driving track data and the road center line, wherein the first relative angle difference sets are in a one-to-one correspondence with the road sections;

in response to a variance of a first relative angle difference set C being less than a pre-stored first angle, determining that a road section corresponding to the first relative angle difference set C is a one-way section, wherein the first relative angle difference set C is any one of all first relative angle difference sets that belong to the first relative angle difference sets and whose variances are less than the first angle; and in response to an average value of the first relative angle difference set C being less than a pre-stored second angle, determining that a road traffic direction of the road section corresponding to the first relative angle difference set C is a forward traffic direction; or in response to the average value of the first relative angle difference set C being greater than or equal to the second angle, determining that the road traffic direction of the road section corresponding to the first relative angle difference set C is a reverse traffic direction.

6. The method according to claim 5, wherein the method further comprising:

in response to a variance of a first relative angle difference set D being greater than or equal to the first angle, determining that a road section corresponding to the first relative angle difference D is a two-way section, wherein the first relative angle difference set D is any one of all first relative angle difference sets that belong to the first relative angle difference sets and whose variances are greater than or equal to the first angle.

7. The method according to claim 6, wherein obtaining lane traffic direction information based on the lane information and the road traffic direction information comprises:

in response to a road section E obtained based on the lane information and the road traffic direction information being a two-way dual-lane section, obtaining two second relative angle difference sets of two lane center lines of the road section E based on a road section center line corresponding to the road section E, wherein the road section E is any one of all two-way dual-lane sections that belong to the road sections;

in response to an average value of a second relative angle difference set F being less than a pre-stored third angle, determining whether a lane center line corresponding to the second relative angle difference set F intersects a right buffer region of the road section center line corresponding to the road section E, wherein the second relative angle difference set F is either of the two second relative angle difference sets; and in response to the lane center line corresponding to the second relative angle difference set F intersecting the right buffer region of the road section center line corresponding to the road section E, determining that a lane traffic direction of a lane on which the lane center line corresponding to the second relative angle difference set F is located is a forward traffic direction, or in response to the lane center line corresponding to the second relative angle difference set F not intersecting the right buffer region of the road section center line corresponding to the road section E, determining that the lane traffic direction of the lane on which the lane center line corresponding to the second relative angle difference set F is located is a reverse traffic direction; and in response to an average value of a second relative angle difference set G being greater than or equal to the third angle, determining whether a lane center line corresponding to the second relative angle difference set G intersects a left buffer region of the road section center line corresponding to the road section E, wherein the second relative angle difference set G is either of the two second relative angle difference sets; and in response to the lane center line corresponding to the second relative angle difference set G intersecting the left buffer region of the road section center line corresponding to the road section E, determining that a lane traffic direction of a lane on which the lane center line corresponding to the second relative angle difference set G is located is a forward traffic direction, or in response to the lane center line corresponding to the second relative angle difference set G not intersecting the left buffer region of the road section center line corresponding to the road section E, determining that the lane traffic direction of the lane on which the lane center line corresponding to the second relative angle difference set G is located is a reverse traffic direction.

8. An apparatus for constructing a map for autonomous driving, comprising:
at least one processor; and
a memory coupled to the at least one processor and storing programming instructions for execution by the at least one processor, the programming instructions instruct the at least one processor to perform the following operations:

obtaining, based on manual driving track data and/or an obstacle grid map, road information, intersection information, and lane information of a region through which a vehicle has traveled;

obtaining road traffic direction information based on the manual driving track data and the road information;

obtaining lane traffic direction information based on the lane information and the road traffic direction information;

obtaining intersection entry and exit point information based on the intersection information and the lane traffic direction information; and executing, based on the intersection entry and exit point information, an operation of generating a virtual topology center line to obtain an autonomous driving map of the region through which the vehicle has traveled, wherein the virtual topology center line is a traveling boundary line of the vehicle in an intersection region, wherein obtaining, based on the manual driving track data and/or the obstacle grid map, the road information, the intersection information, and the lane information of the region through which the vehicle has traveled comprises:

obtaining, based on the manual driving track data and/or the obstacle grid map, a road boundary of the region through which the vehicle has traveled, wherein obtaining the road boundary of the region through which the vehicle has traveled comprises:

determining, based on the manual driving track data and the obstacle grid map, a drivable width of the vehicle at each time moment of a plurality of time moments, wherein the drivable width of the vehicle is determined by summing a first y-axis coordinate along a positive direction and a second y-axis coordinate along a negative direction, wherein the first and second y-axis coordinates are comprised in pose data provided by one or more sensors in the vehicle, and wherein the first and second y-axis coordinates correspond to probabilities greater than a preset probability:

obtaining a plurality of track point buffer regions based on the manual driving track data and/or the obstacle grid map, wherein each track point buffer region of the plurality of track point buffer regions is determined based on a drivable width of the vehicle of at a corresponding time moment of the plurality of time moments;

performing a fusion operation on the plurality of track point buffer regions to obtain a road buffer region; and determining a boundary of the road buffer region as the road boundary of the region through which the vehicle has traveled;

obtaining, based on the road boundary, a road center line of the region through which the vehicle has traveled;

obtaining, based on the road boundary and the road center line, an intersection region of the region through which the vehicle has traveled;

obtaining, based on the road boundary, the road center line, and the intersection region, a lane boundary of the region through which the vehicle has traveled; and obtaining, based on the lane boundary, a lane center line of the region through which the vehicle has traveled.

9. The apparatus according to claim 8, wherein obtaining, based on the road boundary, the road center line of the region through which the vehicle has traveled comprises the programming instructions instruct the at least one processor to perform the following operation:

performing an equi-spaced point forming operation on the road boundary to obtain a road boundary obtained after the equi-spaced point forming;

obtaining a first Thiessen polygon side set based on the road boundary obtained after the equi-spaced point forming;

performing, on the first Thiessen polygon side set, an operation of deleting a Thiessen polygon side outside the road boundary obtained after the equi-spaced point forming, to obtain a second Thiessen polygon side set;

obtaining a buffer region of the road boundary based on the road boundary and a pre-stored first width;

obtaining a third Thiessen polygon side set based on a Thiessen polygon side that is in the second Thiessen polygon side set and that does not intersect the buffer region of the road boundary;

performing a dangling line deletion operation on the third Thiessen polygon side set to obtain a fourth Thiessen polygon side set; and performing a connecting operation on the fourth Thiessen polygon side set, to obtain the road center line of the region through which the vehicle has traveled.

10. The apparatus according to claim 9, wherein obtaining, based on the road boundary and the road center line, the intersection region of the region through which the vehicle has traveled comprises the programming instructions instruct the at least one processor to perform the following operation:

obtaining a center point of each intersection based on the road center line;

determining a circle whose circle center is the center point of each intersection and whose radius is a pre-stored first length as a center point buffer region of each intersection;

performing, on sub-road center lines, an operation of deleting a sub-road center line whose length is less than a pre-stored second length, to obtain each road section center line, wherein each sub-road center line is a remaining road center line outside the center point buffer region of each intersection in the road center line;

obtaining each road section center line buffer region based on each road section center line and a pre-stored second width; and performing, on sub-intersection regions, an operation of deleting a sub-intersection region whose area is less than a pre-stored first area, to obtain the intersection region of the region through which the vehicle has traveled, wherein each sub-intersection region is a remaining intersection region outside each road section center line buffer region in a plane comprising the road boundary.

11. The apparatus according to claim 10, wherein obtaining, based on the road boundary, the road center line, and the intersection region, the lane boundary of the region through which the vehicle has traveled comprises the programming instructions instruct the at least one processor to perform the following operation:

obtaining road section boundaries outside the intersection region in the road boundary;

obtaining road section center lines outside the intersection region in the road center line;

determining, based on the road section boundaries and the road section center lines, whether each of road sections is a single-lane section or a dual-lane section, wherein the road sections are in a one-to-one correspondence with the road section boundaries and the road section center lines;

in response to a road section A being the single-lane section, determining a road section boundary corresponding to the road section A as a lane boundary of a single-lane section through which the vehicle has traveled, wherein the road section A is any one of all single-lane sections that belong to the road sections; and in response to a road section B being the dual-lane section, determining a road section boundary and a road section center line that correspond to the road section B as lane boundaries of a dual-lane section through which the vehicle has traveled, wherein the road section B is any one of all dual-lane sections that belong to the road sections.

12. The apparatus according to claim 11, wherein obtaining the road traffic direction information based on the manual driving track data and the road information comprises the programming instructions instruct the at least one processor to perform the following operation:

obtaining a manual driving track and first relative angle difference sets of road sections based on the manual driving track data and the road center line, wherein the first relative angle difference sets are in a one-to-one correspondence with the road sections;

in response to a variance of a first relative angle difference set C being less than a pre-stored first angle, determining that a road section corresponding to the first relative angle difference set C is a one-way section, wherein the first relative angle difference set C is any one of all first relative angle difference sets that belong to the first relative angle difference sets and whose variances are less than the first angle; and in response to an average value of the first relative angle difference set C being less than a pre-stored second angle, determining that a road traffic direction of the road section corresponding to the first relative angle difference set C is a forward traffic direction; or in response to the average value of the first relative angle difference set C being greater than or equal to the second angle, determining that the road traffic direction of the road section corresponding to the first relative angle difference set C is a reverse traffic direction.

13. The apparatus according to claim 12, wherein obtaining the road traffic direction information based on the manual driving track data and the road information comprises the programming instructions instruct the at least one processor to perform the following operation:

in response to a variance of a first relative angle difference set D being greater than or equal to the first angle, determining that a road section corresponding to the first relative angle difference D is a two-way section, wherein the first relative angle difference set D is any one of all first relative angle difference sets that belong to the first relative angle difference sets and whose variances are greater than or equal to the first angle.

14. The apparatus according to claim 13, wherein obtaining the lane traffic direction information based on the lane information and the road traffic direction information comprises the programming instructions instruct the at least one processor to perform the following operation:

in response to a road section E obtained based on the lane information and the road traffic direction information being a two-way dual-lane section, obtaining two second relative angle difference sets of two lane center lines of the road section E based on a road section center line corresponding to the road section E, wherein the road section E is any one of all two-way dual-lane sections that belong to the road sections;

in response to an average value of a second relative angle difference set F being less than a pre-stored third angle, determining whether a lane center line corresponding to the second relative angle difference set F intersects a right buffer region of the road section center line corresponding to the road section E, wherein the second relative angle difference set F is either of the two second relative angle difference sets; and in response to the lane center line corresponding to the second relative angle difference set F intersecting the right buffer region of the road section center line corresponding to the road section E, determining that a lane traffic direction of a lane on which the lane center line corresponding to the second relative angle difference set F is located is a forward traffic direction, or in response to the lane center line corresponding to the second relative angle difference set F not intersecting the right buffer region of the road section center line corresponding to the road section E, determining that the lane traffic direction of the lane on which the lane center line corresponding to the second relative angle difference set F is located is a reverse traffic direction; and in response to an average value of a second relative angle difference set G being greater than or equal to the third angle, determining whether a lane center line corresponding to the second relative angle difference set G intersects a left buffer region of the road section center line corresponding to the road section E, wherein the second relative angle difference set G is either of the two second relative angle difference sets; and in response to the lane center line corresponding to the second relative angle difference set G intersecting the left buffer region of the road section center line corresponding to the road section E, determining that a lane traffic direction of a lane on which the lane center line corresponding to the second relative angle difference set G is located is a forward traffic direction, or in response to the lane center line corresponding to the second relative angle difference set G not intersecting the left buffer region of the road section center line corresponding to the road section E, determining that the lane traffic direction of the lane on which the lane center line corresponding to the second relative angle difference set G is located is a reverse traffic direction.

15. The apparatus according to claim 14, wherein obtaining the lane traffic direction information based on the lane information and the road traffic direction information comprises the programming instructions instruct the at least one processor to perform the following operation:

in response to a road section H obtained based on the lane information and the road traffic direction information being a two-way single-lane section, determining that a lane traffic direction of the road section H is two-way, wherein the road section H is any one of all two-way single-lane sections that belong to the road sections; and in response to a road section I obtained based on the lane information and the road traffic direction information being a one-way single-lane section, determining a road traffic direction of the road section I as a lane traffic direction of the road section I, wherein the road section I is any one of all one-way single-lane sections that belong to the road sections.

16. A non-transitory computer-readable storage medium having computer-executable instructions stored thereon which, when executed by a processor, cause an apparatus to:

obtain, based on manual driving track data and/or an obstacle grid map, road information, intersection information, and lane information of a region through which a vehicle has traveled;

obtain road traffic direction information based on the manual driving track data and the road information, and obtain lane traffic direction information based on the lane information and the road traffic direction information;

obtain intersection entry and exit point information based on the intersection information and the lane traffic direction information; and perform, based on the intersection entry and exit point information, an operation of generating a virtual topology center line to obtain an autonomous driving map of the region through which the vehicle has traveled, wherein the virtual topology center line is a traveling boundary line of the vehicle in an intersection region, wherein obtaining, based on the manual driving track data and/or the obstacle grid map, the road information, the intersection information, and the lane information of the region through which the vehicle has traveled comprises:

obtaining, based on the manual driving track data and/or the obstacle grid map, a road boundary of the region through which the vehicle has traveled, wherein obtaining the road boundary of the region through which the vehicle has traveled comprises:

determining, based on the manual driving track data and the obstacle grid map, a drivable width of the vehicle at each time moment of a plurality of time moments, wherein the drivable width of the vehicle is determined by summing a first y-axis coordinate along a positive direction and a second y-axis coordinate along a negative direction, wherein the first and second y-axis coordinates are comprised in pose data provided by one or more sensors in the vehicle, and wherein the first and second y-axis coordinates correspond to probabilities greater than a preset probability:

obtaining a plurality of track point buffer regions based on the manual driving track data and/or the obstacle grid map, wherein each track point buffer region of the plurality of track point buffer regions is determined based on a drivable width of the vehicle of at a corresponding time moment of the plurality of time moments;

performing a fusion operation on the plurality of track point buffer regions to obtain a road buffer region; and determining a boundary of the road buffer region as the road boundary of the region through which the vehicle has traveled;

obtaining, based on the road boundary, a road center line of the region through which the vehicle has traveled;

obtaining, based on the road boundary and the road center line, an intersection region of the region through which the vehicle has traveled;

obtaining, based on the road boundary, the road center line, and the intersection region, a lane boundary of the region through which the vehicle has traveled; and obtaining, based on the lane boundary, a lane center line of the region through which the vehicle has traveled.

17. The non-transitory computer-readable storage medium according to claim 16, wherein obtaining, based on the road boundary, the road center line of the region through which the vehicle has traveled comprises:

performing an equi-spaced point forming operation on the road boundary to obtain a road boundary obtained after the equi-spaced point forming;

obtaining a first Thiessen polygon side set based on the road boundary obtained after the equi-spaced point forming;

performing, on the first Thiessen polygon side set, an operation of deleting a Thiessen polygon side outside the road boundary obtained after the equi-spaced point forming, to obtain a second Thiessen polygon side set;

obtaining a buffer region of the road boundary based on the road boundary and a pre-stored first width;

obtaining a third Thiessen polygon side set based on a Thiessen polygon side that is in the second Thiessen polygon side set and that does not intersect the buffer region of the road boundary;

performing a dangling line deletion operation on the third Thiessen polygon side set to obtain a fourth Thiessen polygon side set; and performing a connecting operation on the fourth Thiessen polygon side set, to obtain the road center line of the region through which the vehicle has traveled.

18. The non-transitory computer-readable storage medium according to claim 17, wherein obtaining, based on the road boundary and the road center line, the intersection region of the region through which the vehicle has traveled comprises:

obtaining a center point of each intersection based on the road center line;

determining a circle whose circle center is the center point of each intersection and whose radius is a pre-stored first length as a center point buffer region of each intersection;

performing, on sub-road center lines, an operation of deleting a sub-road center line whose length is less than a pre-stored second length, to obtain each road section center line, wherein each sub-road center line is a remaining road center line outside the center point buffer region of each intersection in the road center line;

obtaining each road section center line buffer region based on each road section center line and a pre-stored second width; and performing, on sub-intersection regions, an operation of deleting a sub-intersection region whose area is less than a pre-stored first area, to obtain the intersection region of the region through which the vehicle has traveled, wherein each sub-intersection region is a remaining intersection region outside each road section center line buffer region in a plane comprising the road boundary.

19. The non-transitory computer-readable storage medium according to claim 18, the road center line, and the intersection region, the lane boundary of the region through which the vehicle has traveled comprises:

obtaining road section boundaries outside the intersection region in the road boundary;

obtaining road section center lines outside the intersection region in the road center line;

determining, based on the road section boundaries and the road section center lines, whether each of road sections is a single-lane section or a dual-lane section, wherein the road sections are in a one-to-one correspondence with the road section boundaries and the road section center lines;

in response to a road section A being the single-lane section, determining a road section boundary corresponding to the road section A as a lane boundary of a single-lane section through which the vehicle has traveled, wherein the road section A is any one of all single-lane sections that belong to the road sections; and in response to a road section B being the dual-lane section, determining a road section boundary and a road section center line that correspond to the road section B as lane boundaries of a dual-lane section through which the vehicle has traveled, wherein the road section B is any one of all dual-lane sections that belong to the road sections.

20. The non-transitory computer-readable storage medium according to claim 19, wherein obtaining the road traffic direction information based on the manual driving track data and the road information comprises:

obtaining a manual driving track and first relative angle difference sets of road sections based on the manual driving track data and the road center line, wherein the first relative angle difference sets are in a one-to-one correspondence with the road sections;

in response to a variance of a first relative angle difference set C being less than a pre-stored first angle, determining that a road section corresponding to the first relative angle difference set C is a one-way section, wherein the first relative angle difference set C is any one of all first relative angle difference sets that belong to the first relative angle difference sets and whose variances are less than the first angle; and in response to an average value of the first relative angle difference set C being less than a pre-stored second angle, determining that a road traffic direction of the road section corresponding to the first relative angle difference set C is a forward traffic direction; or in response to the average value of the first relative angle difference set C being greater than or equal to the second angle, determining that the road traffic direction of the road section corresponding to the first relative angle difference set C is a reverse traffic direction.

* * * * *